(12) United States Patent
Stanwood et al.

(10) Patent No.: US 9,043,853 B2
(45) Date of Patent: *May 26, 2015

(54) SYSTEMS AND METHODS FOR PRIORITIZATION OF DATA FOR INTELLIGENT DISCARD IN A COMMUNICATION NETWORK

(71) Applicant: Cygnus Broadband, Inc., San Diego, CA (US)

(72) Inventors: Kenneth L. Stanwood, Vista, CA (US); David Gell, San Diego, CA (US)

(73) Assignee: Wi-LAN Labs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,512

(22) Filed: Nov. 11, 2013

(65) Prior Publication Data

US 2014/0068680 A1    Mar. 6, 2014

Related U.S. Application Data

(63) Continuation of application No. 13/155,102, filed on Jun. 7, 2011, now Pat. No. 8,627,396, which is a continuation-in-part of application No. 12/813,856, filed on Jun. 11, 2010, now Pat. No. 8,068,440.

(Continued)

(51) Int. Cl.
*H04N 7/173* (2011.01)
*H04N 21/236* (2011.01)
(Continued)

(52) U.S. Cl.
CPC .......... *H04N 21/23605* (2013.01); *H04L 65/00* (2013.01); *H04N 21/234327* (2013.01);

(Continued)

(58) Field of Classification Search
USPC ............................ 725/86–116; 709/217–232
See application file for complete search history.

(56) References Cited

U.S. PATENT DOCUMENTS 5,515,377 A    5/1996   Horne et al.
6,094,435 A *  7/2000   Hoffman et al. .............. 370/414

(Continued)

FOREIGN PATENT DOCUMENTS

CN    1669344 A    9/2005
CN    1719894 A    1/2006

(Continued)

OTHER PUBLICATIONS

Fielding et al. "Hypertext Transfer Protocol—HTTP/1.1." Network Working Group, Standards Track, Jun. 1999, 157 pages.

(Continued)

*Primary Examiner* — Annan Shang
(74) *Attorney, Agent, or Firm* — Procopio, Cory, Hargreaves & Savitch LLP

(57) ABSTRACT

Systems and methods for optimizing system performance of capacity and spectrum constrained, multiple-access communication systems by selectively discarding packets are provided. The systems and methods provided herein can drive changes in the communication system using control responses. One such control responses includes the optimal discard (also referred to herein as "intelligent discard") of network packets under capacity constrained conditions. Some embodiments inspect a video stream to determine priorities for various elements of the video stream. The elements may be discarding using the priorities. In various embodiments, the elements include frames, slices, macroblocks, and data partitions.

48 Claims, 18 Drawing Sheets

Related U.S. Application Data

(60) Provisional application No. 61/421,510, filed on Dec. 9, 2010, provisional application No. 61/186,707, filed on Jun. 12, 2009, provisional application No. 61/187,113, filed on Jun. 15, 2009, provisional application No. 61/187,118, filed on Jun. 15, 2009.

(51) Int. Cl.

| | |
|---|---|
| *H04L 29/06* | (2006.01) |
| *H04N 21/2343* | (2011.01) |
| *H04N 21/24* | (2011.01) |
| *H04N 21/2383* | (2011.01) |
| *H04N 21/647* | (2011.01) |
| *H04N 19/107* | (2014.01) |
| *H04N 19/577* | (2014.01) |
| *H04L 12/24* | (2006.01) |
| *H04L 12/823* | (2013.01) |
| *H04L 12/853* | (2013.01) |

(52) U.S. Cl.
CPC ........ *H04N21/2402* (2013.01); *H04L 65/4069* (2013.01); *H04L 65/80* (2013.01); *H04N 21/2383* (2013.01); *H04N 21/64792* (2013.01); *H04N 19/107* (2014.11); *H04N 19/577* (2014.11); *H04L 41/5022* (2013.01); *H04L 47/32* (2013.01); *H04L 47/2416* (2013.01)

(56) References Cited

U.S. PATENT DOCUMENTS

| | | | |
|---|---|---|---|
| 6,122,252 A * | 9/2000 | Aimoto et al. | 370/235 |
| 6,219,339 B1 | 4/2001 | Doshi et al. | |
| 6,222,841 B1 * | 4/2001 | Taniguchi | 370/389 |
| 6,345,038 B1 | 2/2002 | Selinger | |
| 6,557,031 B1 * | 4/2003 | Mimura et al. | 709/218 |
| 6,747,991 B1 | 6/2004 | Hemy et al. | |
| 6,885,638 B2 | 4/2005 | Xu et al. | |
| 6,922,396 B1 | 7/2005 | Knappe | |
| 7,200,670 B1 | 4/2007 | Hearn et al. | |
| 7,218,619 B2 | 5/2007 | Koo et al. | |
| 7,474,627 B2 | 1/2009 | Chheda et al. | |
| 7,646,781 B2 | 1/2010 | Campion et al. | |
| 8,019,683 B1 | 9/2011 | Swanburg et al. | |
| 8,320,930 B2 | 11/2012 | Stanwood et al. | |
| 8,406,235 B2 | 3/2013 | Walton et al. | |
| 8,509,074 B1 | 8/2013 | Roberts et al. | |
| 2003/0084394 A1 | 5/2003 | Erving et al. | |
| 2003/0195977 A1 | 10/2003 | Liu et al. | |
| 2003/0236745 A1 | 12/2003 | Hartsell et al. | |
| 2004/0028054 A1 | 2/2004 | Khurana et al. | |
| 2004/0073692 A1 | 4/2004 | Gentle et al. | |
| 2004/0203832 A1 | 10/2004 | An | |
| 2005/0021806 A1 | 1/2005 | Richardson et al. | |
| 2005/0021822 A1 | 1/2005 | Cherkasova et al. | |
| 2005/0175085 A1 | 8/2005 | Bergan et al. | |
| 2005/0180351 A1 | 8/2005 | Peric | |
| 2006/0126549 A1 | 6/2006 | Bourlas et al. | |
| 2006/0165172 A1 | 7/2006 | Koh et al. | |
| 2006/0171480 A1 | 8/2006 | Erving et al. | |
| 2007/0180073 A1 | 8/2007 | Paul et al. | |
| 2007/0223575 A1 | 9/2007 | Wang et al. | |
| 2007/0263897 A1 | 11/2007 | Ong et al. | |
| 2007/0286075 A1 | 12/2007 | Shoham et al. | |
| 2008/0126803 A1 | 5/2008 | Ginter et al. | |
| 2008/0267140 A1 | 10/2008 | Lee et al. | |
| 2008/0291935 A1 | 11/2008 | Campion et al. | |
| 2009/0010350 A1 | 1/2009 | Lee et al. | |
| 2009/0034626 A1 | 2/2009 | Park et al. | |
| 2009/0041130 A1 | 2/2009 | Yoon et al. | |
| 2009/0046573 A1 | 2/2009 | Damnjanovic | |
| 2009/0147680 A1 | 6/2009 | Liu | |
| 2009/0147853 A1 | 6/2009 | Dane et al. | |
| 2009/0185618 A1 | 7/2009 | Liu et al. | |
| 2009/0193484 A1 | 7/2009 | Zhang et al. | |
| 2009/0232202 A1 | 9/2009 | Chen et al. | |
| 2009/0245130 A1 | 10/2009 | Bing | |
| 2010/0036953 A1 | 2/2010 | Bogovic et al. | |
| 2010/0216467 A1 | 8/2010 | Ryan et al. | |

FOREIGN PATENT DOCUMENTS

| | | |
|---|---|---|
| CN | 101026572 A | 8/2007 |
| CN | 102104468 A | 6/2011 |
| WO | 2006068445 A1 | 6/2006 |
| WO | 2011086952 A1 | 7/2011 |

OTHER PUBLICATIONS

Baugher et al. "The Secure Real-time Transport Protocol (SRTP)." Network Working Group, RFC 3711, Standards Track, Mar. 2004, 57 pages.

Bocharov et al. "Portable encoding of audio-video objects, The Protected Interoperable File Format (PIFF)." Microsoft Corporation, First Edition Sep. 8, 2009, Revised Mar. 9, 2010, 32 pages.

"Adobe Flash Video File Format Specification", Version 10.1, Aug. 2010, 89 pages.

"HTTP Dynamic Streaming on the Adobe Flash Platform", Adobe, Sep. 2010, 18 pages.

"Advanced Systems Format (ASF) Specification", Microsoft, Revision Jan. 20, 2005, Jun. 2010, 110 pages.

"Protocol Analysis of PPlive and PPstream by Internet Measurement", Yunfei Zhang, China Mobile, Mar. 23, 2009, 13 pages.

http://wiki.theory.org/BitTorrentSpecification, last modified Jun. 7, 2011, 25 pages.

Pantos et al., "HTTP Live Streaming draft-pantos-http-live-streaming-05", Apple Inc., IETF draft, Nov. 19, 2010, 23 sheets.

"[MS-SMTH]: IIS Smooth Streaming Transport Protocol", Microsoft Corporation, Sep. 8, 2009, 55 pages.

"Flash Media Manifest File Format Specification", OSMF.org, Jun. 28, 2010, version 1.01, http://osmf.org/dev/osmf/specpdfs/FlashMediaManifestFileFormatSpecification.pdf, 5 pages.

"PSS: Progressive Download and Dynamic Adaptive Streaming over HTTP (3GP-DASH)", 3GPP Release 10, TS 26.247 V10.1.0, Nov. 2010, 92 pages.

"Dynamic adaptive streaming over HTTP (DASH)", MPEG System Technologies, Part 6, ISO/IEC (FCD) 23001-6, Jan. 28, 2011, 86 pages.

"Information technology—Coding of audio visual objects—Part 12: ISO base media file format, Amendment 3: DASH support and RTP reception hint track processing", ISO/IEC 14496-12, Jan. 28, 2011, 43 pages.

Stockhammer, "Dynamic Adaptive Streaming over HTTP—Design Principles and Standards", Qualcomm Incorporated, accessed on Aug. 11, 2011, 3 pages.

ITU-R Rec. BT.500-12, "Methodology for the subjective assessment of the quality of television pictures", BT Series, Broadcasting service (television), Sep. 2009, 46 pages.

Series P: Telephone Transmission Quality, Telephone Installations, Local Line Networks, Audiovisual quality in multimedia services, "Subjective video quality assessment methods for multimedia applications", ITU-T Rec. P.910, Apr. 2008, 42 pages.

ANSI T1.801.03-2003, "American National Standard for Telecommunications—Digital Transport of One-Way Video Signals—Parameters for Objective Performance Assessment."

Series J: Cable Networks and Transmission of Television, Sound Programme and Other Multimedia Signals, "Objective perceptual video quality measurement techniques for digital cable television in the presence of a full reference", ITU-T Rec. J.144, Mar. 2004, 156 pages.

"ITS Video Quality Research" Video Quality Metric (VQM) website, http://www.its.bldrdoc.gov/n3/video/standards/index.php, accessed Aug. 3, 2011, 3 pages.

Series J: Cable Networks and Transmission of Television, Sound Programme and Other Multimedia Signals, Measurement of the quality of service, "Perceptual audiovisual quality measurement tech-

(56) References Cited

OTHER PUBLICATIONS niques for multimedia services over digital cable television networks in the presence of a reduced bandwidth reference", ITU-T Rec. J.246, Aug. 2008, 42 pages.
Series J: Cable Networks and Transmission of Television, Sound Programme and Other Multimedia Signals, Measurement of the quality of service, "Objective perceptual multimedia video quality measurement in the presence of a full reference", ITU-T Rec. J.247, Aug. 2008, 108 pages.
Farias, "Video Quality Metrics", Department of Computer Science, University of Brasilia (UnB), Brazil, Feb. 2010, 30 pages.
Wang et al., "Image quality assessment: From error visibility to structural similarity", IEEE Transactions on Image Processing, vol. 13, No. 4, Apr. 2004, 14 pages.
"Cisco ASR 5000 Multimedia Core Platform", Cisco datasheet, Cisco Systems, Inc., 2010, 4 pages.
Vukadinovic, "Mobility and opportunistic resource allocation in wireless multimedia networks", Doctoral Thesis, Stockholm, Sweden, 2010, 46 pages.
Qian et al., "Characterizing Radio Resource Allocation for 3G Networks", Nov. 2010, 14 pages.
Kumar et al., "Error Resiliency Schemes in H.264/AVC Standard", Elsevier Inc., Aug. 24, 2005, 26 pages.
International Search Report and Written Opinion issued in corresponding PCT/US2011/053493 on Apr. 9, 2012, in 9 pages.
International Search Report and Written Opinion issued in corresponding PCT/US2011/053495 on Feb. 9, 2012, in 8 pages.
Extended European Search Report for related EP Patent Application No. 11847777.7, mailed on Oct. 16, 2014, in 4 pages.
Fan et al. "An Intelligent Packet Dropping Algorithm with ECN Capability." Journal of Software. 16(9):1636-1646 (2005).
International Search Report and Written Opinion issued Feb. 1, 2011 in PCT/US2010/1038357, 23 pages.
Maani et al. "Optimized Bit Extraction Using Distortion Estimation in the Scalable Extension of H. 264/AVC." Tenth IEEE International Symposium on Multimedia. Dec. 15, 2008, Piscataway, NJ, US. pp. 660-666.
Mehaoua et al. "Performance Analysis of a Partial Video Slice-Level Discard Scheme (Adaptive-PSD) for MPEG Connections over UBR+ Service." 13th International Conference on Computer Communication. Cannes, Nov. 18-21, 1997. Proceedings of International Conference on Computer Communication. pp. 177-184.
Office Action and Search Report mailed on Feb. 7, 2014 for related CN Patent Application No. 201080017221 in 9 pages. An English translation of the Search Report is provided.
Partial European Search Report dated Jan. 24, 2013 in related EP 12185332.9, 7 pages.
Petr et al. "Priority Discarding of Speech in Integrated Packet Networks," IEEE Journal on Selected Areas in Communications, vol. 7, No. 5, Jun. 1989, Abstract, 1 page.
Robles et al. "Active Discarding Packet Mechanisms for Video Transmission." IEEE International Conference on System of Systems Engineering, Apr. 1, 2007. pp. 1-5.
Sriram et al. "Voice Packetization and Compression in Broadband ATM Networks," IEEE Journal on Selected Areas in Communications, vol. 9, No. 3, Apr. 1991, Abstract, 1 page.
Wang et al. "Comments to JMVM 1.0." Joint Video Team (JVT) of ISO/IEC MPEG & ITU-T VCEG (ISO/IEC JTC1/SC29/WG11 and ITU-T SG16 Q.6). vol. JVT-U103. 21st Meeting: Hangzhou, China. Oct. 20-27, 2006, pp. 1-6. Retrieved from http://ftp3.itu.ch/av-arch/jvt-site/2006_10_Hangzhou/JVT-U103.zip.
Yin et al. "Congestion Control for Packet Voice by Selective Packet Discarding," IEEE Trans. on Communications, May 1990, vol. 38, No. 5, Abstract, 1 page.
Office Action and Search Report mailed on Feb. 5, 2015 for related CN Patent Application No. 201210318640.8 in 7 pages.

\* cited by examiner

Frame Viewing Order

Frame Viewing Order

| Frame, j | X(j) |
|---|---|
| 1 | 3 |
| 2 | 1 |
| 3 | 1 |
| 4 | 1 |
| 5 | 1 |
| 6 | 1 |
| 7 | 1 |
| 8 | 1 |
| 9 | 1 |
| 10 | 1 |
| 11 | 1 |
| 12 | 1 |

| Frame, j | X(j) |
|---|---|
| 1 | 10 |
| 2 | 1 |
| 3 | 1 |
| 4 | 2 |
| 5 | 4 |
| 6 | 4 |
| 7 | 3 |
| 8 | 1 |
| 9 | 1 |
| 10 | 2 |
| 11 | 1 |
| 12 | 1 |

FIG. 17

Direct Frame Burden Table D

Dependent Frame (i)

| Frame (j) | 1 | 2 | 3 | 4 | 5 | 6 | 7 | 8 | 9 | 10 | 11 | 12 |
|---|---|---|---|---|---|---|---|---|---|---|---|---|
| 1 |  | 1 | 1 | 1 |  |  | 1 |  |  |  |  |  |
| 2 |  |  |  |  |  |  |  |  |  |  |  |  |
| 3 |  |  |  |  |  |  |  |  |  |  |  |  |
| 4 |  | 1 | 1 |  | 1 | 1 |  |  |  |  |  |  |
| 5 |  |  |  |  |  |  |  |  |  |  |  |  |
| 6 |  |  |  |  |  |  |  |  |  |  |  |  |
| 7 |  |  | 1 | 1 | 1 |  | 1 | 1 | 1 |  |  |  |
| 8 |  |  |  |  |  |  |  |  |  |  |  |  |
| 9 |  |  |  |  |  |  |  |  |  |  |  |  |
| 10 |  |  |  |  |  |  |  | 1 | 1 |  | 1 | 1 |
| 11 |  |  |  |  |  |  |  |  |  |  |  |  |
| 12 |  |  |  |  |  |  |  |  |  |  |  |  |

Weighted, Direct Frame Priority

| Frame | Priority |
|---|---|
| 1 | 15 |
| 2 | 1 |
| 3 | 1 |
| 4 | 5 |
| 5 | 1 |
| 6 | 1 |
| 7 | 7 |
| 8 | 1 |
| 9 | 1 |
| 10 | 5 |
| 11 | 1 |
| 12 | 1 |

FIG. 18

Total Frame Burden Table T

Dependent Frame (i)

| | 1 | 2 | 3 | 4 | 5 | 6 | 7 | 8 | 9 | 10 | 11 | 12 |
|---|---|---|---|---|---|---|---|---|---|---|---|---|
| 1 | | 1 | 1 | 1 | 1 | 1 | 1 | 1 | 1 | 1 | | |
| 2 | | | | | | | | | | | | |
| 3 | | | | | | | | | | | | |
| 4 | | 1 | 1 | | 1 | 1 | | | | | | |
| 5 | | | | | | | | | | | | |
| 6 | | | | | | | | | | | | |
| 7 | | 1 | 1 | 1 | 1 | 1 | | 1 | 1 | 1 | 1 | 1 |
| 8 | | | | | | | | | | | | |
| 9 | | | | | | | | | | | | |
| 10 | | | | | | | | 1 | 1 | | 1 | 1 |
| 11 | | | | | | | | | | | | |
| 12 | | | | | | | | | | | | |

Frame (j)

Weighted, Total Frame Priority

| Frame | Priority |
|---|---|
| 1 | 30 |
| 2 | 1 |
| 3 | 1 |
| 4 | 5 |
| 5 | 1 |
| 6 | 1 |
| 7 | 11 |
| 8 | 1 |
| 9 | 1 |
| 10 | 5 |
| 11 | 1 |
| 12 | 1 |

FIG. 20

Weight Table X

Dependent Frame (i)

| | 1 | 2 | 3 | 4 | 5 | 6 | 7 | 8 | 9 | 10 | 11 | 12 |
|---|---|---|---|---|---|---|---|---|---|---|---|---|
| 1 | | 3 | 3 | 3 | 2 | 2 | 3 | 2 | 2 | 2 | | |
| 2 | | | | | | | | | | | | |
| 3 | | | | | | | | | | | | |
| 4 | | 3 | 3 | | 3 | 3 | | | | | | |
| 5 | | | | | | | | | | | | |
| 6 | | | | | | | | | | | | |
| 7 | | 2 | 2 | 3 | 3 | 3 | | 3 | 3 | 3 | 2 | 2 |
| 8 | | | | | | | | | | | | |
| 9 | | | | | | | | | | | | |
| 10 | | | | | | | | 3 | 3 | | 3 | 3 |
| 11 | | | | | | | | | | | | |
| 12 | | | | | | | | | | | | |

Frame(j)

FIG. 21

SYSTEMS AND METHODS FOR PRIORITIZATION OF DATA FOR INTELLIGENT DISCARD IN A COMMUNICATION NETWORK

This application is a continuation of U.S. patent application Ser. No. 13/155,102, filed on Jun. 7, 2011, which claims the benefit of U.S. provisional patent application Ser. No. 61/421,510, filed on Dec. 9, 2010, all of which are hereby incorporated by reference. U.S. patent application Ser. No. 13/155,102 is also a continuation-in-part of U.S. patent application Ser. No. 12/813,856, filed on Jun. 11, 2010 (now U.S. Pat. No. 8,068,440) which claims the benefit of U.S. provisional patent application Ser. No. 61/186,707, filed on Jun. 12, 2009, U.S. provisional patent application Ser. No. 61/187,113, filed on Jun. 15, 2009, and U.S. provisional patent application Ser. No. 61/187,118, filed on Jun. 15, 2009, all of which are hereby incorporated by reference.

FIELD OF THE INVENTION

The present invention generally relates to the field of communication systems and more specifically to systems and methods for optimizing system performance by selectively discarding packets in capacity and spectrum constrained, multiple-access communication systems.

BACKGROUND

In capacity and spectrum constrained, multiple-access communication system, two goals are omnipresent: the successful transfer of information, and the minimization of such transmissions from disrupting other transfers. Often these goals are in conflict with each other, and thus represent opportunity for system optimization.

In a cellular network, for example, the creation of a positive user experience is the success criteria for the transport of information. Often this metric is further defined as the quality of service of a particular user task or application. In contrast, this activity can be viewed by its effect on other network users, specifically through the usage of limited system resources and through the creation of channel interference.

SUMMARY

Systems and methods for optimizing system performance of capacity and spectrum constrained, multiple-access communication systems by selectively discarding packets are provided. The systems and methods provided herein can drive changes in the communication system using control responses. One such control response includes the optimal discard (also referred to herein as "intelligent discard") of network packets under capacity constrained conditions.

In one aspect a system managing video transmission responsive to network conditions includes a determination module configured to determine a priority value for each frame in a video stream, each frame having a frame type, wherein the priority value of each frame is based on at least in part on the frame type; and a selection module configured to discard one or more frames based at least in part on the priority value of the frames.

In a further aspect each frame comprises one or more slices having a slice type and the determination module is configured to determine a priority value for the one or more slices based at least in part on the slice type. Additionally, the selection module is configured to discard one or more slices based on the priority values of the slices. The discarded slices can be redundant slices. Further, the determination of the priority value of switching slices can be dynamic. In a further aspect each slice comprises a plurality of data partitions, each data partition having a type, and the determination module is configured to determine a priority value for each data partition and the priority value of each data partition is based at least in part based on the frame type.

In a further aspect the determination module is configured to determine the priority value for each frame based at least in part on the priority values for the slices in the frame.

In another aspect each slice comprises one or more macroblocks having a macroblock type, and the priority of each slice is determined based at least in part on the macroblock types of the macroblocks in the slice. Alternatively, the priority value for each slice is based at least in part on the size of the slice. Additionally, the priority value for each frame can be based at least in part on the size of the frame. Further, the priority value for each frame can be based at least in part on whether an adjacent frame has been discarded.

In a further aspect each frame comprises one or more macroblocks having a macroblock type, and the priority of each slice is determined based at least in part on the macroblock types of the macroblocks in the slice.

A further aspect relates to a system for managing video transmission responsive to network conditions having a determination module configured to determine a priority value for each frame in a group of pictures (GOP), wherein one or more of the frames depends on another frame for decoding, and wherein the priority value of each frame is based at least in part on the number of frames which depend from the frame.

In a further aspect a computer implemented method for managing video transmission responsive to network conditions includes receiving a plurality of frames in a group of pictures (GOP) to be transmitted to one or more devices; determining that insufficient bandwidth is available for sending each frame in the GOP; determining a priority value for each frame in the GOP, wherein one or more of the frames depends on another frame for decoding, and wherein the priority value of each frame is based at least in part on the number of frames which depend from the frame; discarding one or more of the frames based on the priority value of each frame; and transmitting the non-discarded frames to the one or more devices.

In another aspect a computer implemented method for managing video transmission responsive to network conditions includes receiving a plurality of frames in a video stream to be transmitted to one or more devices; determining that insufficient bandwidth is available for sending each frame in the video stream; determining a priority value for each frame in the video frame, each frame having a frame type, wherein the priority value of each frame is based on at least in part on the frame type; discarding one or more of the frames based on the priority value of each frame; and transmitting the non-discarded frames to the one or more devices.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 17 is a diagram of a weighting factor vector according to an embodiment;

FIG. 18 is a diagram of a frame burden table and frame priority vector according to an embodiment;

FIG. 20 is a diagram of a frame burden table and frame priority vector according to an embodiment;

FIG. 21 is a diagram of a weighting factor table according to an embodiment;

DETAILED DESCRIPTION

Figure 1:
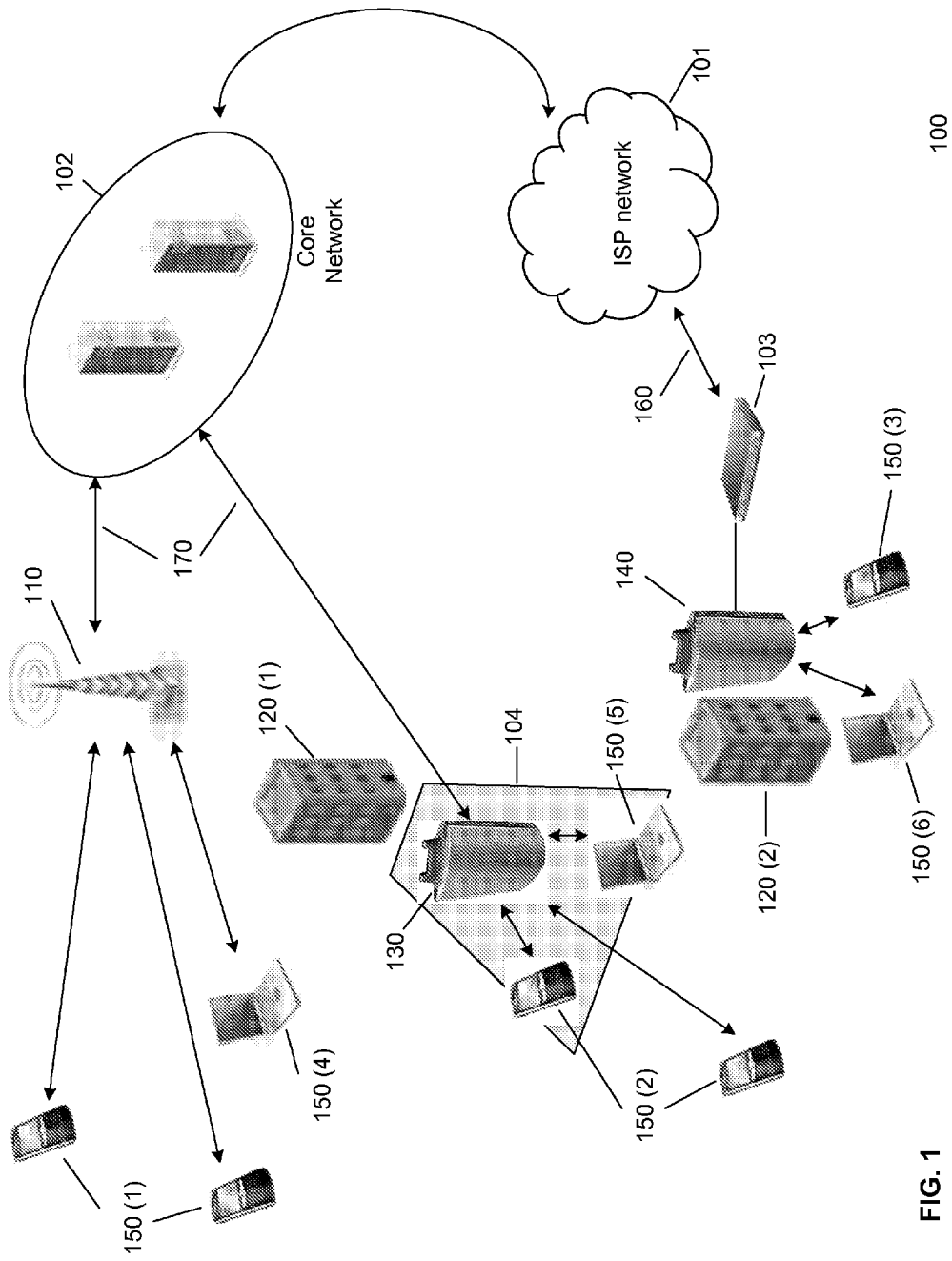
FIG. 1 is a block diagram of a wireless communication network in which the systems and methods disclosed herein can be implemented according to an embodiment.

Some embodiments provide systems and methods for a multivariate control system that can be implemented in a base station or other device. The control system can be configured to for mitigating the effects of various interference scenarios in a capacity and spectrum constrained, multiple-access communication network. In other embodiments, the control system can be configured for making adjustments to or changing the overall bandwidth demands. The systems and methods provided herein can drive changes in the communication system using control responses. One such control responses includes the optimal discard (also referred to herein as "intelligent discard") of network packets under capacity constrained conditions. Some embodiments provide an interactive response by selectively discarding packets to enhance perceived and actual system throughput, other embodiments provide a reactive response by selectively discarding data packets based on their relative impact to service quality to mitigate oversubscription, others provide a proactive response by discarding packets based on predicted oversubscription, and others provide a combination thereof.

According to an embodiment, an interactive response technique is provided that allows transmission and radio access network (RAN)/radio frequency (RF) parameters to be optimized for robustness against interference from neighboring cells and optimized for mitigation of interference to neighboring cells. These optimizations are performed by determining and considering throughput levels and associated quality scores for a set of active services. A high quality user experience can be maintained where perceived and actual system throughput is controlled by selectively discarding packets.

According to an embodiment, a reactive response technique is provided that allows selected data packets to be discarded based on their relative impact to service quality in order to mitigate oversubscription caused by modification of transmission parameters or by varying the RAN/RF parameters to mitigate interference between neighboring cells. Reactively discarding packets in reaction to varying available bandwidth can provide an increase in perceived quality of the user experience for a given amount of bandwidth and can provide an increase in the number of services that can be maintained for a given amount of bandwidth.

According to an embodiment, a proactive response technique is provided that can improve the quality of the user experience and system throughput by predicting oversubscription and selectively discarding packets or marking packets for efficient discard prior to anticipated oversubscription. Proactively discarding packets in reaction to anticipated oversubscription can provide an increase in perceived quality of the user experience for a given amount of bandwidth and can provide an increase in the number of services that can be maintained for a given amount of bandwidth and for a given amount of change in bandwidth. In an embodiment, selectively proactively discarding packets can be used to optimize transmission and RAN/RF parameters to increase robustness against interference from neighboring cells and to mitigate interference to neighboring cells in anticipation of events which cause a need for such parameter changes. Proactively applying intelligent discard and considering intelligent discard to proactively modify transmission and RAN/RF parameters before a bandwidth limiting event occurs can provide a better user experience transition than can be achieved by waiting to apply intelligent discard and to modify transmission and RAN/RF parameters until after such a bandwidth limiting event.

Some embodiments provide systems and methods for a multivariate control system that can be implemented in a base station. The control system can be configured to mitigate the effects of various interference scenarios in a capacity and spectrum constrained, multiple-access communication network. In other embodiments, the control system can be configured for making adjustments to or changing the overall bandwidth demands.

The systems and methods disclosed herein can be applied to various capacity-limited communication systems, including but not limited to wireline and wireless technologies. For example, the systems and methods disclosed herein can be used with Cellular 2G, 3G, 4G (including Long Term Evolution ("LTE"), LTE Advanced, WiMax), WiFi, Ultra Mobile Broadband ("UMB"), cable modem, and other wireline or wireless technologies. Although the phrases and terms used herein to describe specific embodiments can be applied to a particular technology or standard, the systems and methods described herein are not limited to the these specific standards.

Although the phrases and terms used to describe specific embodiments may apply to a particular technology or standard, the methods described remain applicable across all technologies.

According to an embodiment, the systems and methods disclosed herein, including intelligent discard of packets, can be practiced within any entity within the communications system that performs scheduling. This includes the scheduling of downlink bandwidth by any form of base station, including macrocell, picocell, enterprise femtocell, residential femtocell, relays, or any other form of base station. According to an embodiment, intelligent discard can be performed by any form of device which transmits in the uplink direction including user devices, both fixed and mobile, and relay devices. According to an embodiment, intelligent discard can be performed by a scheduling algorithm, housed in the core network which centrally directs the actions of devices. According to an embodiment, intelligent discard can be predictively performed by an entity such as a base station that allocates uplink bandwidth for use by another entity, such as a user device known to be capable of intelligent discard. The base station and the user device can negotiate whether or not the user device has intelligent discard capability, or in some embodiments, whether the user device has intelligent discard capability can be determined based on the model identification of the user device.

Basic Deployments

FIG. 1 is a block diagram of a wireless communication network in which the systems and methods disclosed herein can be implemented according to an embodiment. FIG. 1 illustrates a typical basic deployment of a communication system that includes macrocells, picocells, and enterprise femtocells. In a typical deployment, the macrocells can transmit and receive on one or many frequency channels that are separate from the one or many frequency channels used by the small form factor (SFF) base stations (including picocells and enterprise or residential femtocells). In other embodiments, the macrocells and the SFF base stations can share the same frequency channels. Various combinations of geography and channel availability can create a variety of interference scenarios that can impact the throughput of the communications system.

FIG. 1 illustrates a typical picocell and enterprise femtocell deployment in a communications network 100. Macro base station 110 is connected to a core network 102 through a standard backhaul 170. Subscriber stations 150(1) and 150(4) can connect to the network through macro base station 110. In the network configuration illustrated in FIG. 1, office building 120(1) causes a coverage shadow 104. Pico station 130, which can be connected to core network 102 via standard backhaul 170, can provide coverage to subscriber stations 150(2) and 150(5) in coverage shadow 104.

In office building 120(2), enterprise femtocell 140 provides in-building coverage to subscriber stations 150(3) and 150(6). Enterprise femtocell 140 can connect to core network 102 via ISP network 101 by utilizing broadband connection 160 provided by enterprise gateway 103.

Figure 2A:
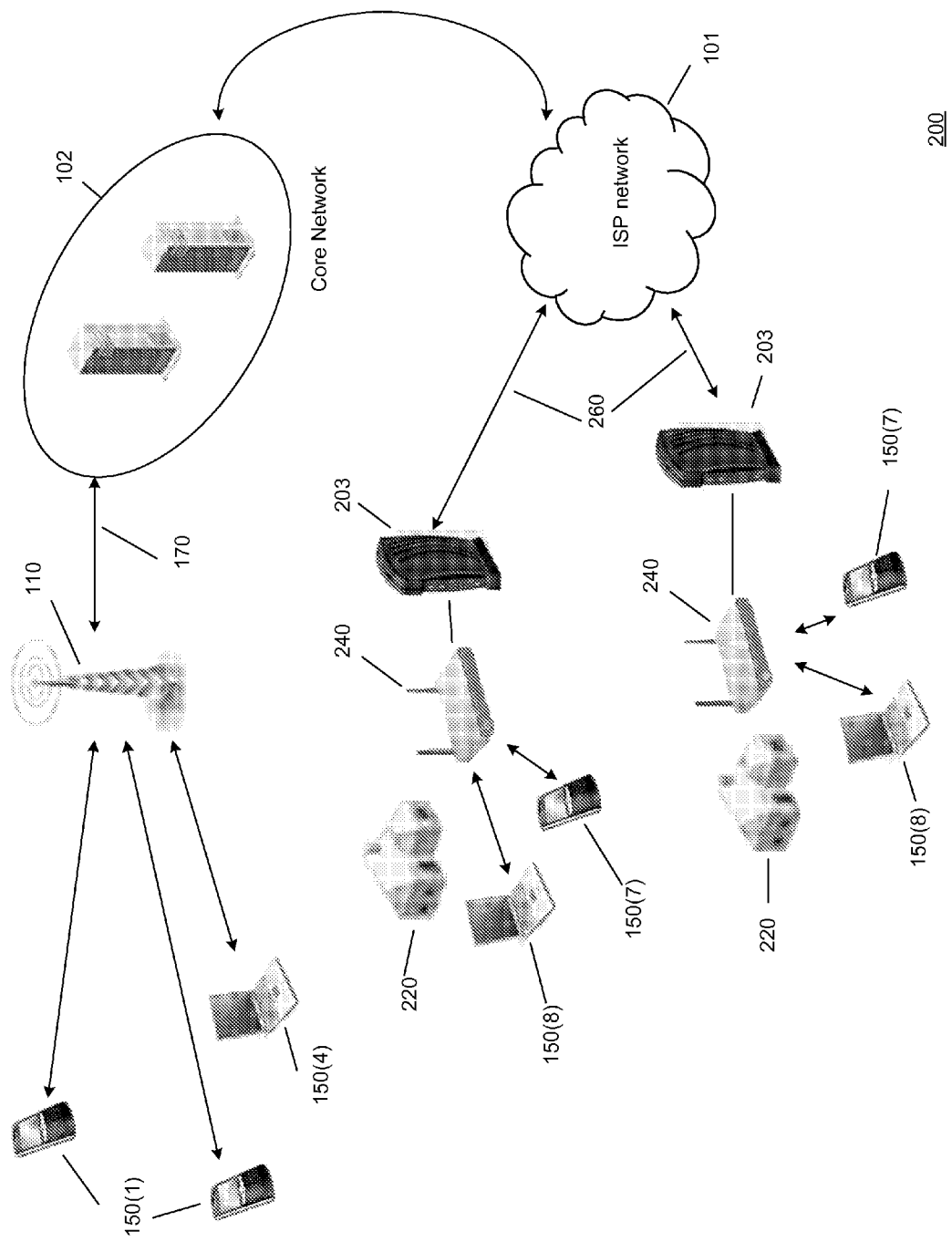
FIG. 2A is block diagram of another wireless communication network in which the systems and methods disclosed herein can be implemented according to an embodiment.

FIG. 2A is a block diagram of another wireless communication network in which the system and methods disclosed herein can be implemented according to an embodiment. FIG. 2A illustrates a typical basic deployment in a communications network 200 that includes macrocells and residential femtocells deployed in a residential environment. Macrocell base station 110 can be connected to core network 102 through standard backhaul 170. Subscriber stations 150(1) and 150(4) can connect to the network through macro base station 110. Inside residences 220, residential femtocell 240 can provide in-home coverage to subscriber stations 150(7) and 150(8). Residential femtocells 240 can connect to core network 102 via ISP network 101 by utilizing broadband connection 260 provided by cable modem or DSL modem 203.

Figure 2B:
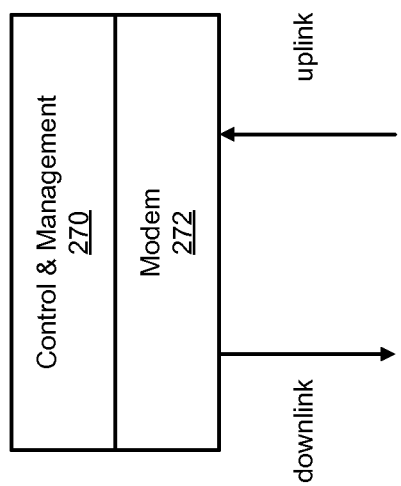
FIG. 2B is a block diagram of an access point or base station that can be used to implement the systems and methods illustrated in FIGS. 3-6 according to an embodiment.

FIG. 2B is a high level block diagram of an access point or base station. The base station includes a modem section 272 which transmits and receives wireless signals. The modem can also measure and determine various characteristics of the received signals. The control and management section 270 was generally responsible for the operation of the base station. In some embodiments described herein, the control and management section 270 implements the system and method described herein in connection with FIGS. 3-6.

Interference Scenarios

Various interference scenarios can result in decreases in perceived and actual performance of the communications network. For example, the 3rd Generation Partnership Project (3GPP) has identified a number of interference scenarios in a technical report (3GPP TR 25.967), which is hereby incorporated by reference in its entirety. Some examples of interference scenarios include: (1) Uplink (UL) transmission from subscriber station to SFF base station interfering with UL of macrocell base station; (2) Downlink (DL) transmission of SFF base station interfering with macrocell base station DL; (3) UL transmission from subscriber station to macrocell base station interfering with SFF base station uplink; (4) DL transmission of macro base station interfering with SFF base station DL; (5) UL transmission from subscriber station to SFF base station interfering with UL of SFF station; (6) DL transmission of SFF base station interfering with SFF base station DL; and (7) interference to and from systems of other technologies.

Avoidance and Mitigation Techniques

Figure 3:
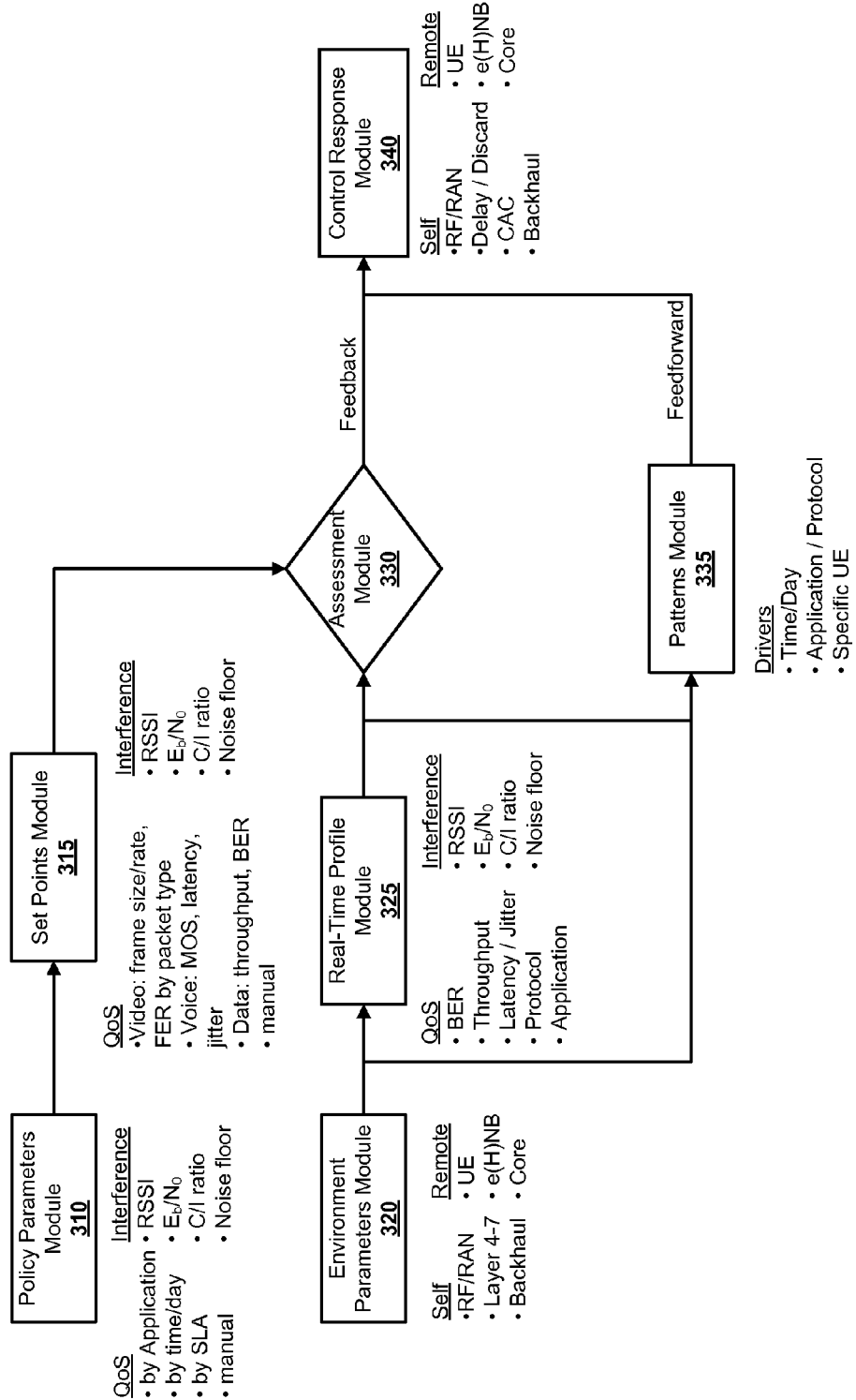
FIG. 3 is a logical block diagram of a system for mitigating effects of interference scenarios in a wireless communication network according to an embodiment.

FIG. 3 is a logical block diagram illustrating an example of the functional elements of a multivariate control system for mitigating the effects of various interference scenarios in a capacity and spectrum constrained, multiple-access communication network, such as those described above, according to an embodiment. The functionality of the system is show in FIG. 3 broken down into modules to more clearly illustrate the functionality of the control system. The control system can be implemented in a macrocell base station, picocell, or femtocell, such as macrocell base station 110, pico station 130, and residential femtocell 240 illustrated in FIGS. 1, 2A, and 2B. Alternatively, portions can be distributed to a base station controller (BSC) or other element of core network 102.

In an embodiment, the control system can be configured to provide optimal responses in the following areas: (1) interference avoidance and (2) interference mitigation. The control system can avoid radio frequency (RF) interface through optimal control of RF/RAN parameters. The control system can also preserve packet quality of service ("QoS") when interference cannot be avoided or when interference avoidance or mitigation result in decreased bandwidth availability.

According to an embodiment, various types of input parameters can be used by the control system. In an embodiment, these input parameters can be divided into policy parameters and environment parameters. Policy parameters module 310 can be configured to receive policy parameters, and environment parameter module 320 can be configured to receive environment parameters. The policy parameters received by policy parameters module 310 are operational requirements defined by, for example, the network provider. These policy parameters can be broken down into two groups of system requirements: QoS policies and interference policies. In an embodiment, the policy parameters can include QoS policies at an application level, by time/day, by service level agreement (SLA), manually define QoS parameters, or a combination thereof. The policy parameters can also include policies related to various interference related parameters, such as received signal strength indicator (RSSI), energy per bit to noise power spectral density ratio ($E_b/N_0$), carrier-to-interference ratio (C/I), noise floor (the measure of the signal created from the sum of all of the noise source and unwanted signals), or other interference related parameters. The control system can use the policy parameters to determine the types of actions that can be undertaken to avoid interference and to mitigate interference when interference cannot be avoided.

The environment input parameters received by environment parameter module 320 comprise real-time information that describes the operating status of the RF network and system environment. This information can be obtained at a base station (e.g., a macrocell, picocell, or femtocell as depicted in FIGS. 1, 2A, and 2B) or reported by a subscriber station and can also include information about neighboring cells. The environment input parameters 320 can be further divided into two categories of input parameters: self environment parameters and remote environment parameters. The self environment parameters are environment parameters related to or obtained by the station in which the control system is implemented. For example, in one embodiment, the self environment parameters can include Layer 1-7 parameters of both the RF and backhaul femtocell or picocell ports. Remote environment parameters are related to or obtained from other cells and/or user equipment operating nearby the base station that can have an impact on the operating environment of the base station. For example, in an embodiment, the remote environment parameters can include Layer 1-7 parameters of the user equipment (UE), Core Network and other neighboring cells defined by base stations, such as evolved Node B (eNB or eNodeB), and pico stations and femtocells, such as evolved Home Node B devices (eHNB or Home eNodeB), collectively e(H)NB devices.

From the policy parameters and environment parameters, additional sets of parameters can be derived including control set points, real-time profile, and patterns. Control set points module 315 is configured to derive control set points from the policy inputs received by the policy parameters module 310 from the network provider or can be derived manually. The control set points comprise quantitative parameters that can be used as control loop target values. These quantitative parameters can be divided into QoS parameters and interference parameters. Some examples of QoS parameters include frame size and frame rate, and frame error rate (FER) by packet type for video content. Some additional examples of QoS parameters include mean opinion score ("MOS"), latency, and jitter for voice content. Additional examples of QoS parameters are throughput and bit error rate (BER) for data content. The interference related parameters can include, but are not limited to, various interference related parameters, such as received signal strength indicator (RSSI), energy per bit to noise power spectral density ratio ($E_b/N_0$), carrier-to-interference ratio (C/I), and noise floor (the measure of the signal created from the sum of all of the noise source and unwanted signals). The control set points can be used by assessment module 330 of the control system to assess the current state of the communication network based on a real-time profile 325 of the RF network and system environment and to determine whether to feedback signals should be generated to adjust the operating state of the network.

The real-time profile module 325 is configured to generate a real-time profile of the communication system based on the environment input parameters received by environment parameter module 320. In an embodiment, the real-time profile comprises quantitative parameters that reflect current operating conditions of the communication network. The real-time profile can comprise QoS and interference related parameters. Some examples of QoS-related parameters include BER, throughput, latency/jitter, protocol-related parameters, and application-related parameters. The interference related parameters can include, but are not limited to, various interference related parameters, such as received signal strength indicator (RSSI), energy per bit to noise power spectral density ratio ($E_b/N_0$), carrier-to-interference ratio (C/I), and noise floor (the measure of the signal created from the sum of all of the noise source and unwanted signals). According to an embodiment, the real-time profile can comprise a datagram, spreadsheet, or other representation of the current operating conditions of the communication network.

Patterns module 335 is configured to generate patterns that comprise a set of historical quantitative parameter patterns that can be used to generate feedforward control responses. The patterns can be derived from the environment parameters received by environment parameter module 320 and the real-time profile generated by real-time profile module 325. These patterns can reflect usage patterns on the network. For example, in an embodiment, the patterns can include specific drivers related to the date and/or time, a specific application or protocol, and/or a specific UE.

The control set points generated by control set points module 315 and the real-time profile generated by real-time profile module 325 can be assessed by assessment module 330 to compare the current operating parameters of the communication network represented in the real-time profile with the control set points to determine whether current operating conditions of the network meet the operational requirements included in the policy parameters. If the current operating conditions of the network do not meet the requirements set forth in the policy parameters, the assessment module 330 can generate feedback signals indicating that operating parameters of the communication system need to be adjusted.

The control response module 340 is configured to receive the feedback signals from the assessment module 330. The control response module 340 (also referred to herein as an optimization module) is configured to optimize the operating parameters of the communication network in an attempt to meet the requirements of the operator policy. The control response module 340 can be configured to generate control signals based on the feedback signals received from the assessment module 330. The control signals fall into two categories: "self" and "remote." Self control signals can be applied to the base station itself (the e(H)NB) to change the operating parameters of the base station and remote control signals can be applied to remote devices or components network, including UEs, the Core Network, and other e(H)NB to change the operating parameters of the remote devices or components of the network.

Figure 4:
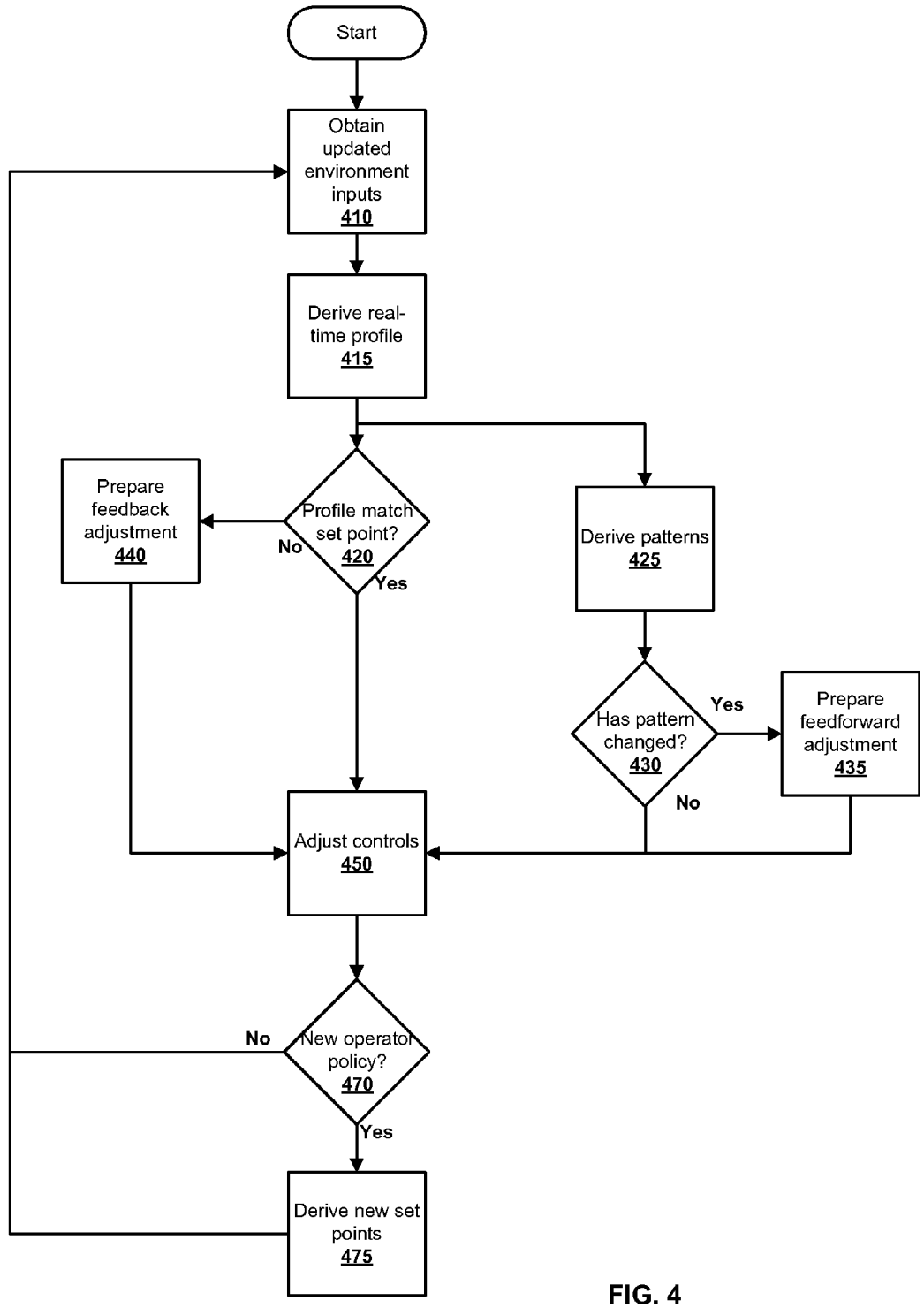
FIG. 4 is a flow diagram of a method that can be used to generate the feedforward and feedback adjustments of the radio frequency (RF) network and system environment using the system illustrated in FIG. 3 according to an embodiment.

FIG. 4 is a flow diagram of a method that can be used to generate the feedforward and feedback adjustments of the RF network and system environment using the system illustrated in FIG. 3 according to an embodiment. Updated environment inputs are obtained that represent the current state or new current state of the RF network and system environment (step 410). The environment inputs correspond to the environment parameters generated by environment parameter module 320 of the communication system. As described above, the environment parameters can comprise real-time information related to the RF network and system environment obtained from both the picocell or femtocell, subscriber stations, and neighboring cells including macrocells, picocells, and femtocells. A real-time profile is also derived from the updated environment inputs (step 415). In an embodiment, the real-time profile corresponds to real-time profile generated by real-time profile module 325 and can be generated from the environment input parameters obtained in step 410.

A determination can be made whether the real-time profile matches the set points generated by control set point module 315 (step 420). As described above, the control set points comprise quantitative parameters that can be used as control loop target values. The control set points can be derived from the policy parameters defined by the network provider. If the real-time profile does not match the set points, the real-time information collected related to the RF network and the system environment indicates that the operating state of the network has deviated from the set points that were derived from the network provider's operator policy. In response, the feedback adjustment control signals can be generated (step 440) to steer the communications network toward an operating state that is consistent with the policy parameters.

Patterns module 335 can derive patterns from the real-time profile and environment input parameters (step 425). In an embodiment, the patterns comprise a set of historical quantitative parameter patterns. A determination is made whether a pattern has changed (step 430), and if a pattern has changed, the historical quantitative parameter patterns that can be used to generate feedforward control responses (step 435) that can be used to adjust various operating parameters that can be used to steer the communication network toward a desired state.

The feedback signals generated in step 440 and the feedforward signals generated in step 435 can be used to generate a set of control signals (step 450) that can be applied to the 'self' e(H)NB and remote devices, including UEs, the Core Network and other e(H)NB.

A determination is made whether the network provider has made changes to the operator policy (step 470). If the network operator has made changes to the policy parameters, new set points can be generated by the control set points module 315 from the operator policy (step 475) before returning to step 410. Otherwise, the method returns to step 410 where the environment inputs are collected.

Inputs

The SFF base station can have access to various environmental information that can be used in generating feedback and feedforward signals for the control response module 340. This information can be part of the environment parameters 320 that can be used to generate the real-time profile generated by real-time profile module 325 and the patterns generated by patterns module 335. The information can be collected by the SFF base station during step 410 of the method illustrated in FIG. 4. For example; according to an embodiment, the following environmental input data is typically available (sensed, reported to, etc.) to an SFF base station: (1) signal strength from macro BTS(s), (2) signal strength from other SFF base station(s), (3) knowledge of whether the macro base stations and the SFF base stations are co-channel (or adjacent channel); (4) neighboring cell identification data; and (5) macro network specific information and system parameter thresholds. Some examples of additional information that can be available to an SFF base station include: DL co-channel carrier RSSI, DL adjacent channel carrier RSSI, common pilot channel (CPICH) Energy per Chip to Total Noise Power (Ec/No), received total wideband power (RTWP), public land mobile network (PLMN) ID, cell ID, Local Area Code (LAC), Routing Area Code (RAC), scrambling codes, co-channel CPICH received signal code power (RSCP), adjacent channel CPICH RSCP, P-CPICH Tx Power, macro cell data rate and macro cell dead-zone coverage. The macro cell data rate and macro cell dead-zone coverage can take into account various information, including macro station load, the number of active SFF base stations, distance of the SFF base stations to the macro station, fading environment, and time-of-day. The SFF base station can have macro station parameter information available to the SFF base station, including target SNR, measured SNR, and received power.

Adjustments

The following item are some examples of the type of parameters that can be adjusted in step 450 by an SFF base station in response to the environment information received via sensing: (1) DL power, (2) UL noise rise target (UL scheduler), (3) UL power, (4) control channel/data channel power ratio, (5) receiver gain, (6) carrier frequency, (7) DL scrambling code, (8) LAC, and (9) RAC.

Additional Inputs

The SFF base station can have access to additional input information. This information can be part of the environment parameters 320 that can be used to generate the real-time profile 325 and patterns 335. The information can be collected by the SFF base station during step 410 of the method illustrated in FIG. 4. For example, additional inputs such as real-time traffic metrics can also be available to an SFF base station and can be used to generate the real time profile 325. For example, real-time traffic metrics, such as the number of active UEs, the number of idle UEs, indicators of UE mobility and changes in position, the aggregate UL usage, the aggregate DL usage, the Layer 4-7 profile (Voice, video, web, FTP, etc.), the backhaul capacity, and the per connection BER. The per connection BER data can be obtained before hybrid automatic repeat request (HARQ) or other retry mechanisms or after HARQ or other retry mechanisms. In some embodiments, the per-connection BER can be obtained without HARQ. In some embodiments, the per-connection BER data can include statistics on retries.

Historical pattern data (such as patterns 335) can also be available to the SFF base station, such as time of day data, day of week data, local holiday data, known/unknown UE entering the network, typical usage rates, and typical usage durations. This historical data can be used to generate patterns 335, which can be used to generate feedforward control signals as described above.

Policy input data can also be available to the SFF base station, such as QoS requirements data, priorities data, packet inspection data, and advanced antenna inputs. This policy information can be part of the operator policy data 310 described above. The QoS requirements data can include delay tolerance data jitter tolerance data, BER/PER tolerance data, minimum acceptance rate data, and/or other QoS related data. The priority input data can include data related to priorities between users, between classes of service, between connections, and/or between packets from the same class of service. Packet inspection data and advanced antenna inputs data can also be available to the SFF base station.

Additional Parameters Adjusted

Additional parameters can be adjusted in step 450 in an attempt to remedy oversubscription. In one embodiment, RAN/RF parameters, such as modulation and coding, subchannelization, time within frame, subchannel and time hopping, multiple-input multiple-output (MIMO) parameters, and beamforming can be used to remedy oversubscription on the communication system. In another embodiment, traffic policing can be used to remedy oversubscription. Various types of types of traffic policing can be used, including rate limiting, packet blocking, packet dropping and/or intelligent discard. Various techniques for intelligent discard that can be used to remedy oversubscription are described below.

Optimizing Performance

According to an embodiment, the described systems and methods include an optimization module to optimize performance by varying extended RAN/RF parameters based on QoS, priority, and policy (also referred to herein as the "optimization module"). According to an embodiment, the optimization module can be implemented in a base station, including a macrocell, picocell, or femtocell base station.

In one embodiment, the optimization module is configured to establish the BER/PER or other quality metric level for each class of service (CoS) or connection. In one embodiment, the quality metric can be prioritized based on known/unknown user equipment, where known user equipment can be given priority over unknown user equipment. The user equipment can include mobile, transient, and stationary subscriber stations. In another embodiment, the quality metric can be prioritized based on specific UE identity, and in yet another embodiment, the quality metric can be prioritized based on the application.

According to an embodiment, the optimization module is configured to establish required/desired throughput for each class of service or connection. The required/desired throughput can be optionally modified based on whether a UE is known or unknown, based on a specific UE identity, or based on a specific application.

According to an embodiment, the optimization module is configured to use a standards based approach to derive baseline interference scenario and baseline RAN/RF parameters.

According to an embodiment, the baseline interference scenario and baseline RAN/RF parameters can change in real-time as conditions change in the communications network. For example, some of the changing conditions include the number of active/inactive UEs, traffic in neighboring cells, and indicators of change in position of UE, such as round trip delay, RSSI, and tracking via receive beamforming.

According to an embodiment, optimization module can vary the actual scenario and actual RAN/RF parameters in real time as conditions change. For example, in one embodiment, if the BER or quality metric of service drops below a threshold, the required physical parameters of service can be set to be more robust than a baseline value. For example, MIMO can be changed and beamforming advanced antenna techniques can be applied. Furthermore, modulation and coding changes can be made to improve robustness. Alternatively, a determination can be made whether to exceed baseline interference scenarios and/or RAN/RF parameters. For example, the determination can be based on sensing data, permission from/negotiation with central controller, permission from/negotiation with neighboring BTSs, or use spatial multiplexing (beamforming, etc.) to minimize interference. Alternatively, a subchannel and time location in frame (e.g., Orthogonal Frequency Division Multiplexing (OFDM) symbol, time slot, etc.) can be chosen to avoid regular interference. Alternatively, subchannels and time location in the frames can be randomized to statistically avoid interference or selectively increase potential caused interference, but mitigate through randomization of impact.

In an embodiment, if demand exceeds new maximum aggregate throughput (DL or UL, including bandwidth for managing active and idles UEs) then optimization module can take steps to mitigate the oversubscription. In one embodiment, delay tolerant traffic can be delayed to temporarily reduce demand. For example, one approach includes delaying and buffering content, such as a live video. Live video can be delayed and buffered so long as the variation in delay (jitter) remains within the capacity/time constraints of the delay/jitter buffer. In another embodiment, substantial deferral of "download for later use" content is used to decrease demand on the network. For example, in one embodiment, downloads of music and/or video content that is not being consumed as the content is received (e.g., non-streaming content) can be temporarily deferred until demand on the network decreases.

In another embodiment, if demand exceeds the new maximum aggregate throughput, optimization module can selectively discard frames within a service to reduce demand on the network. For example, some Moving Picture Experts Group (MPEG) frames are less important than others and can be selectively discarded in order to decrease demand on the communication system. In another example, packets having above a minimum acceptable rate for a service can be discarded to reduce demand.

In yet another embodiment, if demand exceeds the new maximum aggregate throughput, call admission control (CAC) can be used to curtail services. In some embodiments, services can be curtailed based on priority, while in some embodiments services can be curtailed based on the application.

According to an embodiment, the various mitigating actions taken if demand exceeds the new maximum aggregate throughput can be reversed when conditions improve. For example, in one embodiment, hysteresis can be used to smooth reactions.

Figure 5:
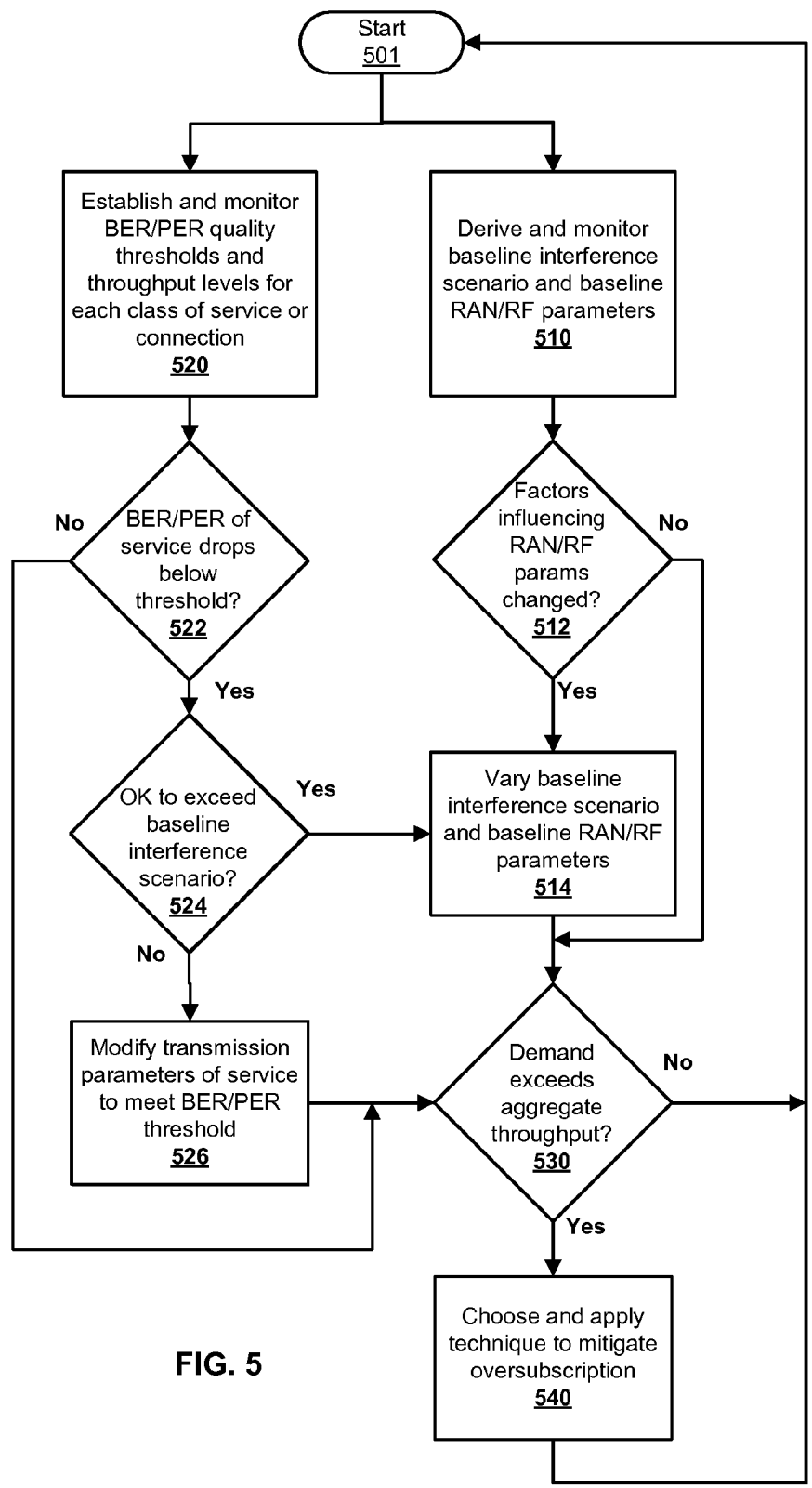
FIG. 5 is a flow diagram of a method for mitigating effects of interference scenarios in a wireless communication network according to an embodiment.

FIG. 5 is a flow chart illustrating a method that can be implemented by the optimization module described above to optimizing performance by varying extended RAN/RF parameters based on QoS, priority, and policy according to an embodiment. In an embodiment, the method illustrated in FIG. 5 can be implemented by the control system illustrated in FIG. 3. In an embodiment, the method of FIG. 5 can be implemented in step 450 of FIG. 4.

The method starts at step 501 where in parallel the method determines RAN/RF aspects of the system (steps 510, 512, and 514) and QoS and traffic management aspects of the system (steps 520, 522, 524, and 526).

In step 510, the baseline interference scenario is derived and monitored and baseline for RAF/RF parameter settings is created. In an embodiment, the inputs used to derive the baseline interference scenario can include typical inputs such as those suggested in the 3GPP TS 25.967, and additional inputs as suggested in this document, or both. The RAN/RF parameters adjusted can include typical inputs such as those suggested in the 3GPP TS 25.967, and additional RAN/RF parameters as suggested in this document, or a combination thereof. In one embodiment, step 510 can be performed by the assessment module 330.

In step 512, a determination is made in real-time whether any of the factors influencing the interference scenario and the RAN/RF parameters that represent the current state of the RF network and the system environment have changed. If these factors have not changed, this parallel activity continues with the method proceeding to step 530. If the factors have changed, the method proceeds to step 514 where the baseline interference and RAN/RF parameters are modified to account for the observed changes, and the method proceeds to decision step 530. In one embodiment, step 512 can be performed by the assessment module 330, and step 514 can be performed by the control response module 340.

The process of managing the influence on classes of service and individual connections, and conversely, managing the influence of individual services and their associated class of service on the interface environment can be begun in parallel with step 510. In step 520, the maximum or target bit error rate (BER) or packet error rate (PER) (or other quality metric) is established for each class of service or each individual service or connection. Each individual service or connection's actual BER, PER, or other quality metric can be monitored. The maximum or target BER and PER values can be determined based on the operator policy information 310 provided by the network provider. Additionally, in step 520, the throughput needs or targets of the service can also be determined. These throughput targets can have multiple levels, corresponding to multiple levels of QoS that require differing levels of throughput. The throughput targets can also take into account expected retransmissions based on knowledge of the applications or the transport mechanisms used at the various layers of communication protocol. In one embodiment, step 520 can be performed by the control set point modules 315.

In step 522, a determination is made whether the actual error rates, such as the BER or PER, or other actual quality metric exceeds a target threshold for the connection determined in step 510. If the BER or other quality metric exceeds the threshold for the connection, the method proceeds to decision step 524 to start the process of taking corrective action. Otherwise, if the quality metric are no worse than the target, the method proceeds to decision step 530. In one embodiment, step 522 can be performed by the assessment module 330.

In step 524, a determination is made whether it is acceptable for the affected service provider to operate in a manner that can exceed the baseline interference scenario and baseline RAN/RF parameters, which could cause greater interference to services active in neighboring cells. For example, a temporary slight increase in transmission power (e.g., 0.5 dB) can add a tolerable increase in interference to services in neighboring cells. If it is acceptable for the affected service provider to operate in manner that can exceed the baseline interference scenario and baseline RAN/RF parameters, the method proceeds to step 514 where the baseline interference scenario and RAN/RF parameters can be temporarily adjusted to accommodate the need for improved QoS for the service. According to an embodiment, this adjustment may be allowed solely for the affected service or connection, or can be allowed generally for the cell. In one embodiment, step 524 can be performed by the assessment module 330 and/or the control response module 340.

If in decision step 524 a determination is made that the baseline interference scenario cannot be exceeded, the method proceeds to step 526 where the transmission parameters of the service are modified to achieve the target BER/PER or quality metric without violating the current baseline interference scenario. In an embodiment, this can include changes in modulation and coding, transmit power or any of the other adjustable transmission parameters. In one embodiment, step 526 can be performed by the control response module 340.

According to an embodiment, when parameters are adjusted, there is a possibility that the bandwidth requirements to meet demand can exceed the current available aggregate throughput of the cell. Hence, both parallel paths of the method proceed to decision step 530, where a determination is made as to whether the demand exceeds the current available aggregate throughput. If the current available aggregate throughput of the cell is not exceeded, the method returns to step 501 and can continuously repeat. Otherwise, the method continues to step 540 before continuing to step 501 to repeat. In step 540, a method to mitigate oversubscription is selected and applied. Several methods for mitigating oversubscription are described below. In one embodiment, steps 530 and 540 can be performed by the control response module 340.

According to an embodiment, the method illustrated in FIG. 5 can include an uplink instance and a downlink instance that operate independently, for example in a Frequency Division Duplex (FDD) system. Conversely, in other embodiments, the uplink and downlink instances may need to share information in a Time Division Duplex (TDD) system where the uplink and downlink are on the same frequency and may, therefore, contribute interference in certain situations. This may be especially true of TDD systems that adapt the uplink/downlink ratio dynamically.

According to an embodiment, the optimization module can also implement another method to optimize performance based on historical data to perform anticipated adaptation to reduce potential oversubscription. According to an embodiment, the optimization module can implement this second method, which can be used to update the operator policy 310. A history of interference can be built through sensing and/or through the use of shared metrics received from other network elements (e.g., the core network, BTSs, UEs). The interference data can be grouped by date and/or time in order to build a picture of interference patterns for various time frames. For example, the interference data can be grouped by the time of day, the day of the week, or by marking the data as holiday or non-holiday. The sensing and/or shared metrics can also include traffic metrics for the SFF base station's own cell and/or for neighboring cells. The can also include "update with memory trail off" where weighted averaging, exponential averaging, or some other method is used to give higher importance to more recent data.

Preemptive decisions can be made based on the history of interference that has been built. For example, a determination can be made whether more or less strict CAC, policy, and/or power control may help to reduce the likelihood of oversubscription. In an embodiment, a determination can be made whether trading off likely robustness versus BER/PER.

According to an embodiment, real time monitoring based on the first method described above and illustrated in FIG. 5 can be used in case unexpected usage patterns disrupt the predictive interference method described in the second method. In an embodiment, predictive data can be used for a baseline scenario and the first method can be used for real-time optimization of the system. In another embodiment, predictive data generated using the second method can be used to update the operator policy 310, and the first method can be used to apply the updated policy.

Intelligent Discard

Referring to FIG. 5, intelligent discard can be used as one of the techniques of algorithm step 540 to mitigate oversubscription caused by modification of transmission parameters in step 526 or caused by varying the interference scenario and RAN/RF parameters in step 514. This is the reactive form of intelligent discard. Alternatively, knowledge of available intelligent discard techniques may be used to influence the throughput level target in step 520, the transmission parameter modifications in step 526, and the changes to the interference scenario and RAN/RF parameters in step 514. This is the interactive form of intelligent discard. The interactive form may further be made proactive by using other system information to predict the future oversubscription of bandwidth.

According to an embodiment, intelligent discard can be practiced by any entity of the communications network that performs scheduling. This can include the scheduling of downlink bandwidth by any form of base station including macrocell, picocell, enterprise femtocell, residential femtocell, relays, or any other form of scheduling. Intelligent discard can be performed by any form of device that transmits in the uplink direction, including user devices, both fixed and mobile, and relay devices. In an embodiment, intelligent discard can be performed by a scheduling algorithm that is implemented in the core network, which centrally directs the actions of devices. In another embodiment, intelligent discard can also be predictively performed by an entity, such as a base station, that allocates uplink bandwidth for use by another entity, such as a user device capable of intelligent discard. The base station and the user device can negotiate whether or not the user device has intelligent discard capability or it may be known based on the model identification of the user device. According to an embodiment, this approach where an entity, such as a base station, that allocates bandwidth for use by another entity in the network capable of intelligent discard, can coordinate with the other entity, such as a user device, can be referred to as cooperative intelligent discard.

Reactive Intelligent Discard

In step 530 of FIG. 5, a determination is made whether or not the application layer throughput demand for bandwidth currently exceeds the available aggregate throughput or whether a specific session or connection is exceeding its allocated throughput. For instance, in step 520, throughput level targets can be established for the active connections being serviced by the base station in question. These target levels can be expressed in such quantitative terms as bits per second or bytes per second. In an embodiment, these target levels can include allowances for retransmissions. Based upon the transmission parameters selected in step 526 and the RAN/RF parameters selected in steps 510 and 514, the throughput levels can be translated into required physical layer resources, such as the resource blocks used in 3GPP LTE, QAM symbols, OFDM symbols, subchannels, UL/DL ratio, or combinations thereof. The required physical layer resources can include allowances for HARQ or other retransmissions. Once converted to physical layer resources, the throughput level targets or demand can be compared against available physical layer resources as is indicated in step 530. This comparison may return a result indicting that demand for physical resources currently exceeds available physical resources. In this case, a reduction in physical resource demand is necessary in order to not exceed available physical resources. This in turn determines a necessary reduction in the current demand for bandwidth at the session, connection and/or application.

According to an alternative embodiment, other algorithms can be used to determine whether the demand for physical resource exceeds the available physical resources which can provide an available throughput metric that can be used for reactive intelligent discard.

Once a determination is made that application layer throughput demand exceeds available physical resources, intelligent discard can be used in step 540 to reduce the demand while minimizing the need to curtail individual services and while maximizing the quality perceived by the end user.

For instance, if the demand for resources for a VoIP service exceeds the available physical resources by 10%, random (not intelligent) discard may cause consecutive or near consecutive VoIP packets to be discarded. In contrast, reactive intelligent discard can identify a number of packets that can be dropped in order to reduce at least a portion of the excess demand for bandwidth while preserving the perceived quality of the call. For example, in one embodiment, in an intelligent discard system, the scheduler can discard every tenth packet. This could include packets already queued by the scheduler, or packets as they are being queued, or both. The even distribution of discarded packets by the intelligent discard algorithm may be less noticeable to the end user than clumping of discarded packets by a random discard algorithm. According to an embodiment, other patterns can be used to select the packets to be discarded, so long as the selected pattern minimizes the number of consecutive and near consecutive packets that are discarded.

According to an embodiment, the discard algorithm can also be adjusted depending on the specific voice protocol and codec being used. Intelligent discard can allow the call to continue with acceptable quality, as determined by a quality score and compared to the operator, system, or local policy.

In another example, in MPEG-2 transmissions, audio packets are more important than video packets, because humans notice changes in audio quality in MPEG-2 transmissions more readily than they notice changes in video quality. Additionally, the video packets are comprised of intra-coded frames ("I-frames"), predictive-coded frames ("P-frames"), and bidirectionally-predictive-coded frames ("B-frames"). The loss of an I-frame is typically more detrimental to the quality of an MPEG-2 transmission than the loss of a P-frame or B-frame. In fact, the loss of an I-frame can result in the receiving device being unable to use a P-frame, even if the P-frame is received correctly. So, in MPEG-2 intelligent discard may discard P-frames and B-frames preferentially to I-frames and may discard all forms of video frames preferentially to audio frames.

For MPEG-4 transmission, in addition to the distinction between frames inherited from MPEG-2, there are 11 levels of spatial scalability, 3 levels of temporal scalability, and a variable number of levels of quality scalability depending upon the video application. Fine grain scalability combines these into 11 levels of scalability. In an embodiment, "marking" of packets with information can be performed and the markings can be used by intelligent discard to allow a fine grained varying of quality as available physical resources change.

As with the VoIP example, in the MPEG examples, intelligent discard can perform discard of already queued packets as well as discard upon entry to the scheduling queue. The intelligent discard of a percentage of packets can allow more services to be maintained and accepted by the system's call admission control (CAC) algorithms.

In step 540, there may be more than one choice of service that can have intelligent discard applied to meet the physical layer resource constraints. There are numerous criteria that can be used to choose the service or services to which to apply intelligent discard. For instance, intelligent discard can be applied in a round robin fashion, similarly impacting all services or all services within a selected class or set of services. Intelligent discard can be applied based on the identity of the end user or membership of the end user in some group. For instance, different users may pay more or less for different service level agreements with the operator of the network. Users with a lower level agreement may be impacted preferentially to users with a higher level agreement. Users that are roaming from another network may be impacted by intelligent discard preferentially to users that subscribe directly to the network. The decision can be based on service type or application. For instance, a VoIP call being made via a third party application such as Skype may be impacted preferentially to a VoIP call made via a VoIP service directly provided by the operator. Which service to impact can be determined algorithmically to maximize total throughput. The decision on how to apply intelligent discard is based on system, operator, or autonomous policy. For instance, a device may have a default policy which may be modified or overridden by a system or operator policy.

The decision as to which services to impact can be based on relative degradation, impacting first, for example, those service whose observed quality is least impacted by intelligent discard regardless of the relative quantity of discarded data. To facilitate this, step 540 can calculate a score for each of the possible throughput levels for the various services. These scores represent a relative level of observed quality for each throughput level. These scores may be based on subjective criteria, such as MOS scores used to score voice quality, or may be quantitative such as the elimination of a feature from the service. The scores can be used in step 540 as part of the determination of which service will have intelligent discard applied and to what extent. For example, once a set of scores for a set of possible throughput levels for services requiring bandwidth, a target bandwidth level can be selected for one or more of the services based on the set of scores calculated for the various throughput levels, and packets associated with each service can be selectively discarded to reduce the throughput associated with each of the services to the target throughput level associated with that service.

Reactive intelligent discard can be performed in any portion of the system that can make a choice regarding transmission or disposition of a packet. For instance, in one embodiment, a base station, pico station, femto station or relay station can include a transceiver for transmitting and receiving packets. According to a preferred embodiment, these stations can include a medium access control (MAC) layer responsible for allocation of bandwidth on the uplink and/or the downlink. The MAC layer preferably can contain or be associated with a scheduler and buffers for storing packets prior to transmission. In one embodiment, the intelligent discard techniques disclosed herein can be implemented in the portion of the MAC layer responsible for buffering ad scheduling the transmission of packets. Alternatively, the equivalent of the MAC scheduler can reside in a core network element that performs centralized scheduling, and possibly, buffering. For example, in one embodiment, the equivalent of the MAC scheduler could be implemented to coordinate simultaneous transmission of data, such as broadcast video or audio, on two or more base stations or other similar devices.

In an embodiment, the intelligent discard techniques can also be implemented in the MAC scheduler of a user device that schedules and buffers data prior to transmission in the uplink. According to an embodiment, the core network or base station (or equivalent device) can be configured to mark packets prior to buffering to facilitate making easier discard decisions in the downlink direction. Alternatively, a function preceding the buffering of packets for uplink transmission by the user device can mark packets for easier discard decisions by the MAC scheduler function in the user device.

Interactive Intelligent Discard

In addition to the previously described reactive intelligent discard, the intelligent discard algorithm can interact with other aspects of the system control to gain improved performance. For example, referring now to FIG. 5, in one embodiment changing a particular RAN/RF network operating parameter, such as lowering the maximum transmit power in step 510, might benefit neighboring cells by reducing the observed interference of those cells.

Alternatively, choosing a more robust modulation scheme in step 526 can also have a similar effect. In a typical system, these changes could be undesirable due to the resulting decrease in available physical resources, causing the application layer throughput demand to exceed available bandwidth. In contrast, in a system employing interactive intelligent discard, in step 520, a set of throughput levels can be calculated for the active services. The set of throughput levels represents a larger range of physical resource demands when the possible transmission parameter choices of step 526 and possible RAN/RF parameters of step 510 are considered. Knowledge of these possible combinations of quality levels, transmission, and RAN/RF parameters allows the system in steps 510 and 526 to choose parameters that can substantially increase robustness of the system, temporarily or permanently, at the sacrifice of a small amount of quality to one or more services.

Alternative Implementation of Interactive Intelligent Discard

Figure 6:
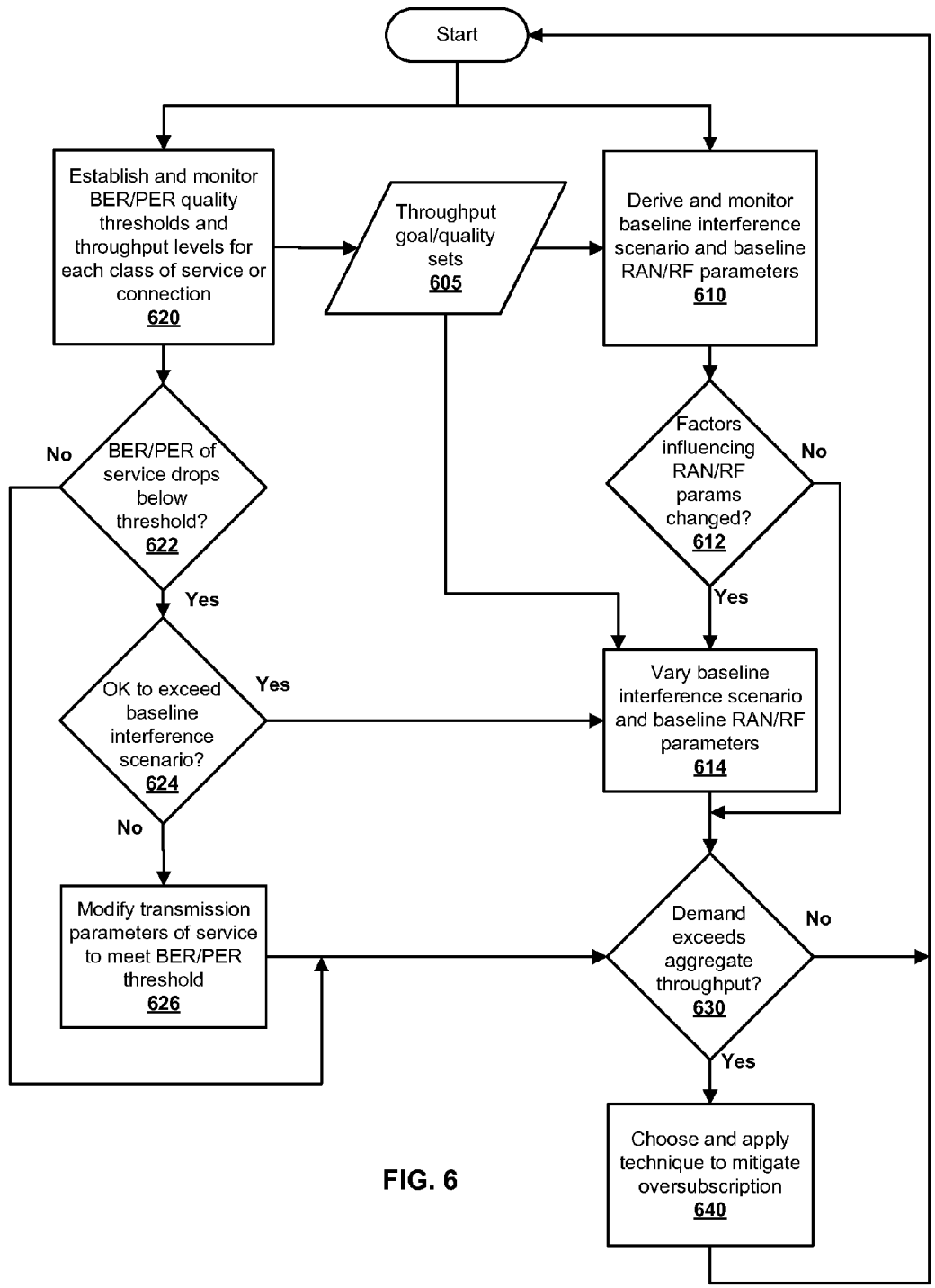
FIG. 6 is a flow diagram of a method for mitigating effects of interference scenarios in a wireless communication network according to an embodiment.

FIG. 6 is a flow diagram of a modified version of the method illustrated in FIG. 5 that enables other aspects of network operation, such as interference mitigation and power control, to make use of intelligent discard to further optimize system performance. In step 620, rather than creating a single quality (e.g., BER or PER) and throughput level for a service or connection (as in step 520 of FIG. 5), a set of throughput levels and/or range of quantitative quality thresholds (e.g., BER and PER) can be created (605). A score can be applied to each of the throughput levels. The score represents a relative level of observed quality for each throughput level. According to an embodiment, a score can be applied to each of the throughput levels to indicate a relative level of observed quality for each throughput level. The scores can be based on subjective criteria, such as MOS scores used to score voice quality, or the scores can be quantitative, such as the elimination of a feature from the service. The scores can be used in step 640 as part of the determination of which server will have intelligent discard applied and to what extent.

The set of throughput levels and scores, exemplified by data block 605, can be used by step 610, decision step 612, and modified step 614 to make tradeoffs between service quality and other system operational factors. Other steps, such as step 626 can also use the set of throughput levels and scores to optimize performance choices. For instance, based on the throughput levels and scores, the method in step 610 can choose to apply a more robust modulation and lower power the baseline parameters for a service, with the knowledge that the performance degradation to the individual service will be small relative to the reduction in interference caused to neighboring cells. In fact, the change in RAN/RF parameters can be a reaction to a request for interference reduction from a neighboring cell, or a command or request for interference reduction or noise floor reduction from a network management entity or other centrally located control function, or an autonomous decision to reduce power, interference potential, or some other aspect of network operation. In this way, step 610 and similar functions can assess the quality impact implied by the throughput impact resulting from potential alternative actions that can be applied to the previously independent task of choosing appropriate RAN/RF parameters.

In a preferred embodiment, an interactive intelligent discard method implements the discard function in the equivalent of the MAC layer scheduler and packet buffering capability prior to transmission by the transceiver of the station, user device, or network function implementing interactive intelligent discard. The derivation of sets of quality thresholds, throughput levels, and scores can be performed by a function that can be implemented in the core network, the base station (macro, pico or femto), or user devices and provides the information to the interactive intelligent discard function which interacts with the buffering and scheduling in the MAC layer to perform intelligent discard. The interactive intelligent discard function can also interact with the physical layer functions, which monitor the RF environment, and interacts with core network functions or functions on other base stations or network elements to exchange information about the RF environments of neighboring cells. A network facing function within interactive intelligent discard can provide information regarding the services, user devices, and RF environment to a core network function or to an interactive intelligent discard function on neighboring devices. The interactive intelligent discard method can provide information to an RF or Physical Layer (PHY) control module, which adjusts the RAN/RF parameters for the transmission of certain information packets.

Proactive Intelligent Discard

According to an embodiment, proactive intelligent discard is a technique for predictively performing intelligent discard in anticipation of oversubscription conditions and for performing the discard before the oversubscription conditions actually occur. Proactive intelligent discard can be used to reduce anticipated demand when the anticipated demand for network bandwidth exceeds anticipated available bandwidth.

Proactive intelligent discard may be applied reactively. For example, expectation of a handover creates expectation of more robust modulation and, therefore, lower throughput per physical layer resource unit as a mobile station approaches the edge of a cell. Proactive intelligent discard can be used to discard ahead of the actual event, allowing smoother handovers with controlled discard of data rather than random loss of data due to congestion.

Proactive intelligent discard can be applied interactively. For instance, it may be known from historical data that interference to or from neighboring cells increases at a certain time of day (daily commute, etc.). In proactive intelligent discard, step 612 can determine that the factors influencing the RAN/RF parameters are about to change, and in step 614 the RAN/RF parameters can be modified based on the assumption that the change will be needed in combination with the set of throughput levels and scores created by step 620 in order to proactively modify the system parameters so that intelligent discard can preserve optimal throughput and quality based on the systems policies regarding quality and throughput.

Proactive intelligent discard may be performed based on a variety of stimuli or trigger events. Some examples of the types of stimuli or trigger events that can be used to trigger the execution of proactive intelligent discard include:

(1) Motion—if it is determined that the device is not stationary or is exceeding some speed threshold, proactive intelligent discard may anticipate the need to perform intelligent discard based on expectations of motion caused changes in physical parameters that impact throughput availability.

(2) Expectation of handover—if it is determined that the likelihood of handover exceeds some threshold metric, intelligent discard can proactively discard data in a controlled fashion so as to minimize the quality impact of predicted decrease in resources.

(3) Time of day, day of week, or other historical patterns—historical data may show that decrease in resources may be expected at predictable points in time. Proactive intelligent discard can prepare the system for smooth transition to lower resources.

(4) Active/inactive user devices in a cell—The number of user devices in a cell may be used to predict fluctuations in demand that would cause reactive intelligent discard to take action.

(5) Reserve resources—proactive intelligent discard can aid in service quality preservation by proactively performing intelligent discard to keep resources in reserve for other functions such as Call Admission Control which may be able to serve more active calls if intelligent discard is applied (6) Changes to Neighbor Cells—information regarding changes in the quantity and configuration of neighboring cells, including but not limited to: number of neighbor cells, location of neighbor cells, Cell Operator, frequency and bandwidth of operation, number of active/idle UEs, RF/RAN parameters.

Additionally, proactive intelligent discard can provide a smoother transition from one level of discard to another, minimizing the impact on quality of service parameters such as jitter and individual packet delay.

In an embodiment, proactive intelligent discard can also be used in an implementation where the discard occurs before being needed, applying a lower throughput in anticipation of lack of resources. In an alternative embodiment, proactive intelligent discard can be used in an implementation where the packets to be dropped during the period of expected lack of resources are tagged for quick discard, but only discarded in the event that the anticipated lack of resources actually occurs.

In an embodiment, the intelligent discard can also perform the inverse role: accelerating packet transmission into the channel before a capacity limitation comes into effect. This may allow the avoidance of a future short-term resource constraint.

The historical or other data that is used to create the patterns or history that is used to proactively implement intelligent discard can come from a variety of sources. For example, RF modules can collect information regarding the physical environment. In another example, the MAC layer can collect information regarding packet demand and throughput, and numbers of active or inactive user devices and services. In one embodiment, the information can be processed locally on a device to convert the inputs into historical trends, or in an alternative embodiment, the information can be forwarded to a function in the core network or any other processor for conversion into historical trends and patterns. The historical trends and patterns can be used locally by a device or may be shared between devices, such as in the case where interactive intelligent discard is applied proactively.

In the following paragraphs various additional embodiments related to discarding packets are described. Some of the embodiments are described with reference to particular standards. However, it will be appreciated that the embodiments described herein may be applied to other systems and standards. It will also be appreciated that the embodiments of intelligent discard described below may be implemented using the systems and methods described above including reactive intelligent discard, proactive intelligent discard, and interactive intelligent discard. For example, the embodiments described below may be used in conjunction with the embodiments of intelligent discard describe above with respect to FIGS. 4-6. Further, the embodiments described below may be implemented using embodiments of the systems described above such as the systems described with respect to FIGS. 1-3.

In particular, discarding packets according to one or more of the embodiments described below can be practiced within any entity within the communications system that performs scheduling. This includes the scheduling of downlink bandwidth by any form of base station, including macrocell, picocell, enterprise femtocell, residential femtocell, relays, or any other form of base station. In another embodiment, discarding packets according to one or more of the embodiments described below can be performed by any form of device which transmits in the uplink direction including user devices, both fixed and mobile, and relay devices. According to another embodiment, discarding packets according to one or more of the embodiments described below can be performed by a scheduling algorithm housed in the core network which centrally directs the actions of devices or which schedules a service common to multiple end user devices such as a multicast or broadcast video service.

According to another embodiment, discarding packets according to one or more of the embodiments described below can be predictively performed by an entity such as a base station that allocates uplink bandwidth for use by another entity, such as a user device. The base station and the user device can negotiate whether or not the user device is capable of discarding packets according to one or more of the embodiments described herein, or in some embodiments, whether the user device has intelligent discard capability can be determined based on the model identification of the user device.

According to another embodiment, the prioritization of packets described below can be performed in one device, such as a device performing deep packet inspection, and may result in a marking of packets where such marking is used by another device, such as a wireless base station, which is performing intelligent discard.

Figure 7:
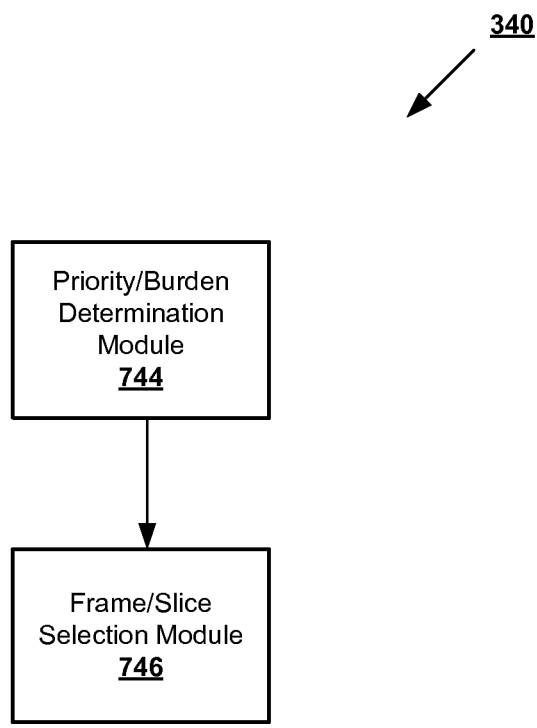
FIG. 7 is a logical block diagram of a system for mitigating effects of interference scenarios in a wireless communication network according to an embodiment.

FIG. 7 is a functional block diagram of one embodiment of control response module 340 of FIG. 3. As described above, in one embodiment, if demand exceeds maximum aggregate throughput for the network, the control response module 340 can respond by selectively discarding frames within a service to reduce demand on the network. In the embodiment of FIG. 7, the control response module 340 comprises a priority/burden determination module 744 ("determination module") and a frame/slice selection module 746 ("selection module"). As in greater detail below, when frames or slices, the choice of which frame or slice to discard can have significant effects on the quality of the viewing experience in the resulting video. In one embodiment, determination module 744 determines a value, e.g., burden or priority, that represents the relative importance of that frame compared to other frames. The selection module 746 then selects one or more to discard or drop based on the determined value. The operation of the determination module 744 and the selection module 746 are described in greater detail below.

Prioritization for Intelligent Discard

As discussed in part above, in MPEG-2, MPEG-4, and H.264-AVC (MPEG-4 Part 10) a video stream is encoded into different types of frames: intra-coded frames or I frames, sometimes referred to as Intra frames, predictive-coded frames or P frames, and bidirectionally-predictive-coded frames or B frames. A frame represents what is displayed on the viewing screen at the frame rate of the viewing device. For instance, the NTSC standard used in the United States operates at 29.97 frames per second. The frames are comprised of macroblocks. A macroblock corresponds to a 16×16 pixel region of a frame.

The different frame types have different dependencies which can impact error propagation in the video signal. I frames are encoded such that they are not dependent on any other frames. This causes I frames to typically contain the largest amount of data. P frames are encoded based on an I frame or P frame. This allows encoding of primarily the differences between the current P frame and the I or P frame on which it is dependent. This in turn allows P frames to typically contain less data than I frames, i.e. they are smaller and consume less bandwidth to transmit. However, an error in the frame on which a P frame is dependent will propagate errors into the decoding of the P frame even if it is received error free. B frames are dependent on both a preceding I or P frame and a following I or P frame. This dual dependency allows B frames to typically contain less data than either I frames or P frames, but furthers error propagation. I frames and P frames are often referred to as anchor frames or reference frames.

These dependencies are realized at the macroblock level. I frames only contain I macroblocks which are encoded without dependencies on macroblocks in other frames. P frames may contain I macroblocks or P macroblocks, or both. P macroblocks are encoded based on a previous (or next) I frame or P frame. B frames may contain I, P, or B macroblocks or any combination. B macroblocks are bidirectionally encoded based on both a previous and a subsequent I or P frame.

The pattern of I frames, P frames, and B frames and the associated decode dependencies are referred to as a group of pictures (GOP) or a predictive structure.

In addition, H.264-AVC augments the allowable dependencies with multi-reference predictive structure such that a P frame may be dependent on multiple I or P frames. It also adds hierarchical predictive structures which allow B frames to be dependent on other B frames rather than only I and P frames. Embodiments involving both the baseline implementation and the augmentations are described below.

A GOP starts with an I frame and may be characterized by two numbers M, the distances between anchor frames (I or P frames), and N, the distance between I frames. The gaps between anchor frames are filled with B frames. A common GOP structure is the M=3, N=12 open GOP shown in 8A. The GOP is considered open because the last B frames of the GOP are dependent upon the last P frame of the current GOP and the I frame of the next GOP.

Figure 8A:
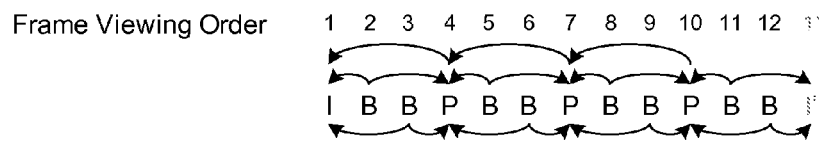
FIG. 8A is a diagram of plurality of frames in a group of pictures according to an embodiment.

FIG. 8A shows the viewing order of the frames in a GOP. The viewing order is indicated with the frame numbers 1 through 12. The frame number 1' indicates the first frame in the next GOP. The letter below each viewing order frame number indicates the type of frame, I, P, or B at that frame number. The arrows indicate which frame a particular frame is dependent upon. For instance, frame 4 is a P frame dependent upon I frame 1. Frame 10 is a P frame dependent upon P frame 7. Frames 5 and 6 are B frames dependent on P frames 4 and 7. It can be seen that an error in I frame 1 could propagate through all eleven other frames in the GOP and the last two B frames of the preceding GOP. Worse yet, a loss of frame 1 would make frames 2 through 12 and the last two B frames of the preceding GOP useless to the decoder. Delaying frame 1 past the time it is to be displayed can have the same effect as the loss of frame 1. Conversely, in this example, loss or erroneous reception of a B frame does not propagate errors and affects only the individual B frame. Note that there are modes in H.264 where B frames can be dependent on other B frames creating a more complex hierarchy, but there will be "leaf node" frames on which no other frames are dependent.

In some systems, control and management section 270 addresses this problem of error propagation by applying greater protection to I frames than P frames and B frames, reducing the impact of poor signal quality on the decoder's ability to decode and display the video. However, while beneficial, this causes the I frames, which are already large, to consume even more bandwidth. This approach can also cause problems with out of order transmission of frames which is not supported by many video decoders.

In other systems, the control response module 340 can respond to dropping frames. One approach is for the control response module 340 to select a frame to drop based on the types of frames being transmitted. For example, given the choice between I, P, and B frames, the control response module can be configured to drop B frames before P frames and P frames before I frames. The decision of which frame amongst several of the same type can be made, for example, at random.

In contrast, in other embodiments described herein, the control response module 340 analyzes and takes advantage of the frame dependencies to preserve the quality of the experience (QoE) of the viewer while intelligently degrading the quality of service (QoS) of the transmission of the video data to use less bandwidth to react to congestion in the transmission medium or to allow more video or data services on the medium simultaneously.

In one embodiment, the control module 340 goes beyond mere classification of I, P, and B frames and determines the relative importance of the frames. As described above, there is an importance attributable to error propagation and the ability for the encoder to use a subsequent frame. But, there is also an element of importance based on the distribution of frames that have equal error propagation importance. These will both be described with reference to FIG. 8B.

Figure 8B:
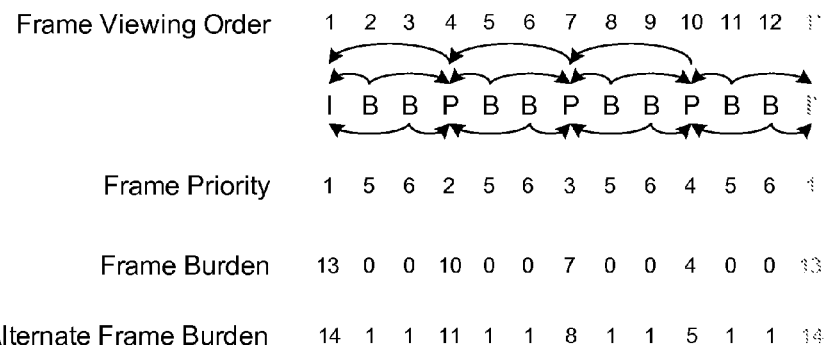
FIG. 8B is a diagram of plurality of frames in a group of pictures according to an embodiment.

FIG. 8B shows the same GOP with the same dependencies that was used in FIG. 8A. In addition, in a column with each frame order number and frame type are values indicative of priority, burden, and alternative formulations of burden. In one embodiment, the priority, burden, and alternative burden values are determined by the determination module 744. The manner in which the priority and burden values are determined by the determination module 744 are described in greater detail below.

In some embodiments, the frame priority and burden values shown are suitable for marking, for instance by a deep packet inspection (DPI) device preceding the transmitting device. Thus, the functionality described herein with respect to the determination module 744 may be performed by another device including a device other than a device comprising the system described with respect to FIG. 3. In such a case, the selection module 746 uses the previously determined priority burden values to select the frames to be dropped. However, for the purpose of explanation, the priority and burden determination functionality is described with respect to determination module 744. In some embodiments the described functionality of determination module 744 may be contained and implemented in Real-Time Profile Modules 325 or may advantageously have its functionality distributed between the Environment Parameters Module 320, which may for instance determine that a data stream is a video stream, the Real-Time Profiles Module 325, which may for instance make real-time assessment of a video frame's priority, and Patterns Module 335, which may for instance determine the GOP structure through observation over time.

In the present description, a lower priority number indicates a greater frame importance, although it should be clear that the reverse relationship could be used. These priorities indicate a relative importance that would allow the transmitting device to intelligently discard frames when faced with congestion or oversubscription of the transmission medium. Frames with a higher priority number are discarded in preference to frames having a lower priority number.

With respect to the GOP of FIG. 8B, in one embodiment, the I frame is necessary to be transmitted for all other frames to be useful, so the determination module assigns the I frame at frame 1 a priority value of 1. The P frames chain their dependence off of the I frame, so the determination module assigns the first P frame a lower priority (higher number) than the I frame, but a higher priority (lower number) than the subsequent P frame. Following this pattern, the determination module gives the P frames in the GOP the priority numbers 2, 3, and 4 respectively. One skilled in the art would recognize that lower priority numbers could instead map to lower actual priorities, and higher priority numbers could map to higher actual priorities.

In one embodiment, since a B frame is dependent upon other frames, the determination module assigns the B frame a lower priority (higher number) than any frames on which they are dependent. This works well for B frames numbered 8, 9, 11, and 12 in the transmission order since they are all dependent upon P frame number 10 which has priority 4 and is the lowest priority P frame. However, B frames numbered 2 and 3, are less important than P frame 4 as well, even though they don't depend on it. This is for two reasons. First, as previously described, discard of B frame 2 or B frame 3 does not propagate errors while discard of P frame 4 requires the discard of B frames 8, 9, 11, and 12 as well. Second, the P frames are evenly distributed in the GOP. Discarding P frames tends to cause numerous frames in a row to be missing, not merely one in a row. So, in one embodiment, the determination module assigns B frames lower priority (higher numbers) than any P frames.

Importantly, all B frames are not themselves entirely equal in importance. In particular, the importance of a B frame can change based on whether or not an adjacent B frame is discarded. This occurs because, under certain circumstances, dropping multiple consecutive frames has a worse effect on video quality than dropping frames that are not consecutive. For example, if B frame 5 were discarded, then subsequently discarding B frame 6 would lead to 2 frames in a row being discarded. However, a subsequent discard of B frame 12 instead would not cause this to occur.

Advantageously, the determination module can predict and account for this change in importance. To do so, in one embodiment, the determination module assigns an initial priority number of 5 to all B frames in the GOP. However, where there are consecutive B frames, the B frame having a higher frame number in the GOP is assigned a lower priority (higher number) by the determination module. Thus, in the example of FIG. 8B the determination module assigns the B frames alternating priorities of 5 and 6 to predict their change in importance after a neighboring B frame is discarded. In another embodiment, the determination module assigns all B frames the same priority values and the selecting module 746 could select B frames for discard uniformly rather than in clusters if and when discard was necessary.

The functionality of the determination module for determining priority can be summarized as follows: An I frame is assigned priority 1. A P frame dependent on frame with priority y, is assigned priority y+1. If z is the largest priority number of any P frame then either: all B frames are assigned priority z+1, or B frames between two anchor frames are assigned priorities z+1, z+2, . . . z+(M−1), where M is the spacing between anchor frames. Alternatively, B frames between two anchor frames are assigned priorities z+(M−1), z+(M−2), . . . , z+1.

In another embodiment, the determination module can determine the importance of a frame based, at least in part, on how many other frames are dependent upon it. For instance, the I frame at position 1 in the GOP of FIG. 8B has 13 other frames that are directly or indirectly dependent upon it. This includes the other 11 frames in this GOP and, since this GOP is open, the last two B frames of the previous GOP which depend on the I frame. The B frames all have 0 other frames dependent upon them. The P frames 4, 7, and 10 have 10, 7, and 4 frames dependent upon them, respectively. This value determination based on dependency is referred to herein as burden. FIG. 8B shows the burden values for the frames in the GOP.

Figure 9:
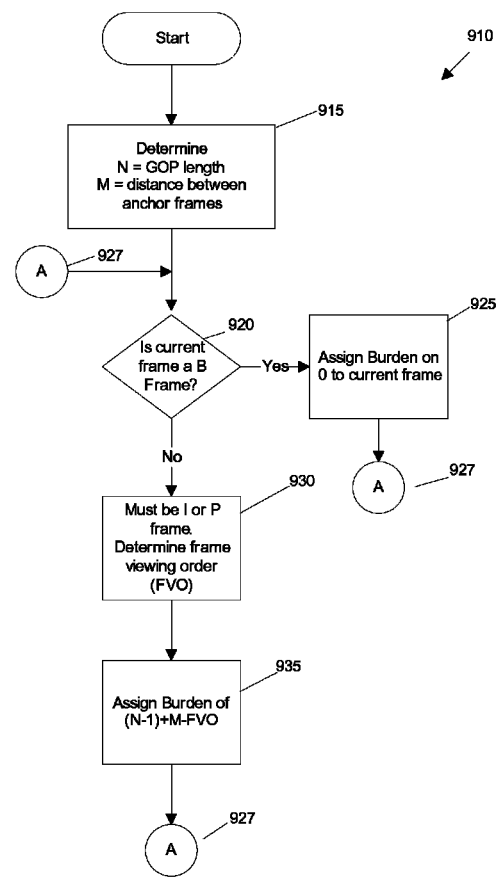
FIG. 9 is a flow diagram of a method for determining priority for frames in a group of pictures according to an embodiment.

FIG. 9 describes one embodiment of a method 910 for determining burden for frames in a GOP. As described above, the method may be implemented by the determination module 744. In another embodiment, the method may be implemented by another device or module. For the purpose of explanation, the method is described with respect to the decision module. At step 915, the decision module determines the value N, the number of frames in the GOP, and M the distance between anchor (I or P) frames in the GOP. In the example GOP of FIG. 8B, N=12 M=3. This determination can be made by analyzing the frames in the GOP. Alternatively, if these values have previously been determined, the determination module can obtain the previously determined values.

At decision step 920, the determination module determines if the current frame being considered is a B frame. If so, the method proceeds to step 925 and the determination module assigns the current B frame a burden of 0. In one embodiment, the assigned burden can be stored in a data structure associated with the frame or the GOP. After the assignment, the next frame in the GOP is made the current frame and the method returns to point 927 before decision step 920.

Returning to decision step 920, if the current frame is not a B frame, the method proceeds to step 930. At step 930 the determination module determines the frame viewing order (FVO) of the current frame. Again this value can be determined by analyzing the frames in the GOP or by obtaining a previously determined FVO. At step 935 the determination module assigns a burden to the current frame equal to the result of equation 1:

$$\text{Burden}=(N-1)+M-\text{FVO} \qquad \text{Eq. 1})$$

After the assignment, the next frame in the GOP is made the current frame and the method returns to point 927 before decision step 920. This process continues until the determination module has assigned a burden value for each frame in the GOP.

As shown in FIG. 8B, when determining burden, the determination module may alternatively count each frame as burdening itself as well. In this embodiment, the determination module assigns a burden of 1 to each B frame. The anchor frames are assigned a burden according to equation 2:

$$\text{Burden}=N+M-\text{FVO} \qquad \text{Eq. 2})$$

Using either burden calculation, the selection module 746 can intelligently select frames for discarding by discarding those with the lowest burdens first. For frames with the same burden, the selecting module can discard uniformly, i.e., not clumps of adjacent frames, when discard is needed. Alternatively, the selecting module can select between frames of the same burden for discard based on size. For instance, two B frames may be of different sizes because one contains more I or P macroblocks than the other does. If available bandwidth resources allows transmission of the larger B frame, the selection module can preferentially select for discard the smaller B frame over the larger B frame since it contains less information and its loss should, therefore, degrade the video quality less than discarding the larger B frame. However, if available bandwidth resources will not accommodate transmission of the larger B frame due to its size, the selection module can discard the larger B frame instead of the smaller B frame.

Figure 10:
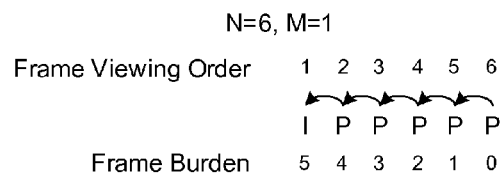
FIG. 10 is a diagram of plurality of frames in a group of pictures according to an embodiment.

FIG. 10 illustrates a GOP that does not contain any B frames. The method described above with respect to FIG. 9 works with these types of GOPs such as those from MPEG-1 and the H.264-AVC baseline profile, or MPEG-2, MPEG-4, or H.264-AVC GOPs for applications that do not want the extra decoding delay caused by B frames. These frames are inherently not open since there are no B frames to have bidirectional dependencies. The determination module can use the same methods for analyzing this type of GOP.

Figure 11:
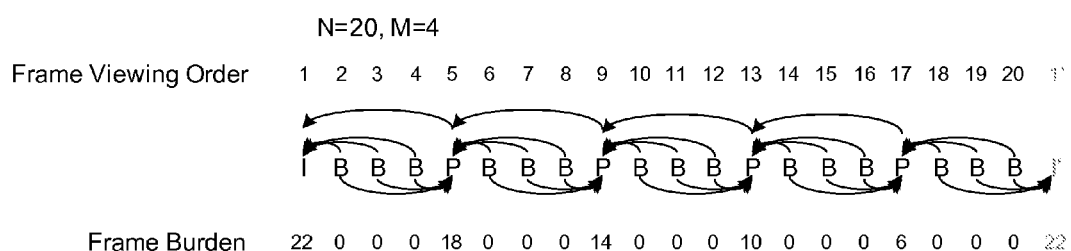
FIG. 11 is a diagram of plurality of frames in a group of pictures according to an embodiment.

FIG. 11 illustrates another type of GOP three B frames between anchor frames (M=4). The method described above with respect to FIG. 9 works with these types of GOPs as well. In particular, the determination module can use the same methods for analyzing this type of GOP.

Hierarchical and Multi-Reference Predictive GOP Structures

As previously mentioned, there exist features within standards such as H.264-AVC which allow for hierarchical or multi-reference GOP prediction structures. In the case of a hierarchical GOP, B frames can depend on previous and/or subsequent B frames. The use of multi-reference GOPs allows P frames to depend on one or more P or I frames.

Figure 12:
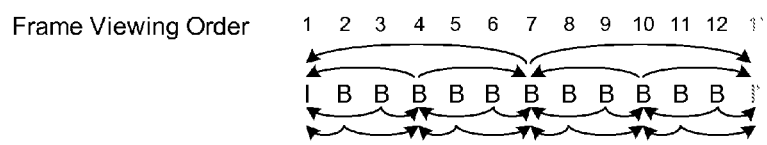
FIG. 12 is a diagram of plurality of frames in a group of pictures according to an embodiment.

FIG. 12 illustrates one example of a hierarchical GOP. In particular, FIG. 12 shows a 12 frame (N=12) hierarchical GOP structure in viewing order. The sequence begins with an I-frame, and being an open-GOP, includes references to the I-frame, 1', of the next GOP. There are no P frames and a subset of B frames reference other B frames. For example, B4 references both I1 and B7, and B3 references I1 and B4. The hierarchical set of relationships creates a distinction of purpose and importance among B frames not seen when analyzing non-hierarchical GOPs. This provides additional information for the determination module to consider when analyzing the propagation of errors through a GOP and when calculating frame burden and priority.

For example, in one embodiment, the control response module 340 can require that a single B frame be discarded to meet available capacity, then frames B2, B3, B5, B6, B8, B9, B11 or B12 would be preferable to frames B4, B7 and B10 since the former list contains all 'leaf' nodes whose discard would have no effect on subsequent frames. In this embodiment, the control response module 340 discards a leaf node instead of a node from which other frames depend.

Figure 13:
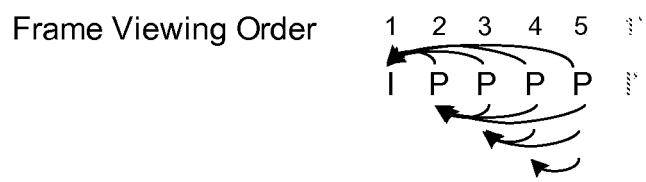
FIG. 13 is a diagram of plurality of frames in a group of pictures according to an embodiment.

FIG. 13 illustrates one example of a multi-reference GOP. In this example, frame P2 has just one reference frame, I1. However frame P3 references two preceding frames, P2 and I1. Frame P4 references P3, P2 and I1. These additional references improve the data compression and reduce the size of the later P frames within the GOP.

Figure 14:
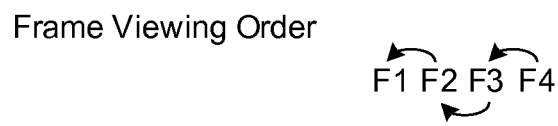
FIG. 14 is a diagram of plurality of frames in a group of pictures according to an embodiment.

In one embodiment, the determination module applies an alternative determination process to hierarchical and multi-reference GOP structures such as the GOPs of FIGS. 12 and 13. In one embodiment, the determination module assigns a burden to each frame based on the quantity of frames dependent on it, within a GOP. In making this assessment, the determination module considers two classes of dependencies: direct and indirect. FIG. 14 illustrates a set of 4 generic frames F1-F4 for the purpose of discussion. Frame F2 is considered a direct dependent of Frame F1 since Frame F2 directly references Frame F1 for the decoding of its information. Frame F3 is a first level, indirect dependent of Frame F1 since Frame F3 references Frame F2 directly and Frame F2 references Frame F1 directly. By extension, Frame F4 is a second level, indirect dependent of Frame F1.

Figures 15, 16:
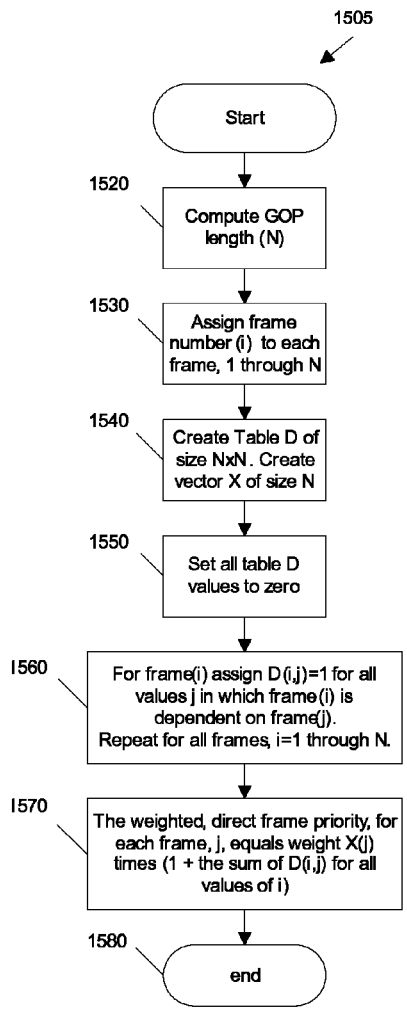
FIG. 15 is a flow diagram of a method for determining burdens for frames in a group of pictures according to an embodiment.
FIG. 16 is a diagram of a weighting factor vector according to an embodiment.

FIG. 15 illustrates a method 1510 for calculating direct frame burden. As described above, the method may be implemented by the determination module 744. In another embodiment, the method may be implemented by another device or module. For the purpose of explanation, the method is described with respect to the decision module.

At step 1520, the determination module calculates N, the length or size of the GOP currently being processed. At step 1530, the determination module assigns a frame number to each frame, beginning at 1 for the leading I frame. In one embodiment, these frame numbers are the frame viewing order of the frames. At step 1540, the determination module creates a table, D, of size N by N for storing intermediate burden information. The determination module also creates a weighting vector, X, of size N. In another embodiment, the determination module utilizes an existing table and vector instead of creating new ones. At step 1550, the determination module initializes the table D by zeroing out each of its values. In another embodiment, the table may have been previously initialized.

At step 1560 the determination module creates a mapping between frames which are directly dependent on each other in the table D. In particular, for each frame, i, in the GOP, the determination module inspects and records the dependencies on all other frames, j, in the GOP. Once a dependency of frame i on frame j is identified, a value of one is assigned to table D at position (i,j), where i denotes the column and j denotes the row. For example, if frame 2 is the current frame under consideration (i) and depends on frame 1 (j), the determination module assigns a value of one in table D at position (2,1). One skilled in the art would recognize that the notation D(i,j) with i as the column and j as the row is logically equivalent to the notation D(j,i) as long as the notation is used consistently throughout the algorithm.

At step 1570 the determination module determines weighted direct frame priority for each frame. In particular, for each frame j, the determination module sums the values of table D(i,j) for all values of i and adds one. This sum is the number of direct dependencies on frame j. The determination module then multiplies the sum by the weight X(j) from the weighting vector X. The resulting values can be stored in a length N vector by the determination module. The values in this result vector represent the weighted, direct frame priority of the frames in the GOP.

FIG. 18 illustrates a direct frame burden table D. Table D of FIG. 18 was generated according to the method described with respect to FIG. 15 using the GOP shown in FIG. 12. As shown, each entry (i,j) in table D indicates whether frame (i) depends from frame (j). For example, since frame B3 is dependent on B4 in this GOP, a value of one is located at D(3,4). The resulting weighted, direct priority for each frame j is also shown in FIG. 18. The result is the sum of the values for that that frame, i.e., the sum of the ones in that frame's row of table D, plus one, multiplied by the corresponding weight from weighting vector X shown in FIG. 16. As shown, Frame I frame I1 has the highest priority. However, in contrast to the burdens of B frames generated by the determination module according to the method described above with respect to FIG. 9, the burdens of the B frames shown in FIG. 18 are based upon the number of dependencies. Accordingly, the determination module assigns the B frames burdens of 1, 5 or 7 units.

In one embodiment, the determination module at step 1560 considers each frame to be dependent upon itself. In this embodiment, at step 1570 the determination module does not need to add one to the summation from table D.

In another embodiment, direct frame burden table D is replaced with a 1×N vector D' by the determination module. In this embodiment, at step 1590, the determination module increments D'(j) by one for each frame i that is dependent on frame j. The weighted, direct priority for frame j is then calculated by multiplying D(j) by X(j) for each element j.

As described, the method 1505 results in a relative description of priority between frames based on at least two factors: (1) the quantity of directly dependent frames and (2) the frame weight. The weighting vector X(j) may be created in a number of ways.

For example, in one embodiment, weighting vector X comprises values such that the weight assigned to I frames are larger than P frames, which in turn are larger than B frames. FIG. 16 illustrates a weighting vector X with this structure for the GOP shown in FIG. 12. In this example, weighing vector X has a value of 3 for 1 frames, 2 for P frames and 1 for B frames. Thus frame 1, the only I frame, is assigned a value of 3 and the remainder of the frames which are all B frames are assigned a value of 1.

In another embodiment, weighting vector X comprises values based upon the size of the frames. It some situations, it is advantageous to increase the priority of larger frames as they most likely contain additional scene detail or motion when compared to smaller frames. The use of size in weighting can be done independently of the type of frame (I, B or P) or both size and type of frame may be considered. For example, with reference to the GOP of FIG. 12, leaf frames B5 and B6 may contain important scene detail or motion. In this case, the sizes of these B-frames would be larger than the remaining leaf and non-leaf B frames. The weighting vector X can account for this by increasing the weighting values corresponding to frames B5 and B6.

In one embodiment, the weighting vector is assigned relative weights (for example 1-10) based upon the relative or absolute size of the frames. In one embodiment, the assignment is made using a closed form expression, a histogram function, or another type of function. In one embodiment, the assignment function creates weights of either integer or real number form. The function can be linear or non-linear.

FIG. 17 illustrates a weighting vector X where the weighting values incorporate the size of the frames as discussed above. The weighting vector corresponds to the GOP shown in FIG. 12. As can be seen in FIG. 17, frame I1 has the largest weight due to its size. Non-leaf node frames B7, B4 and B10 have weights larger than 1 due to the larger encoded size of these frames. Because leaf nodes B5 and B6 contain substantial amounts of detail or motion, their larger size results in weights higher than all other B frames.

Figure 19:
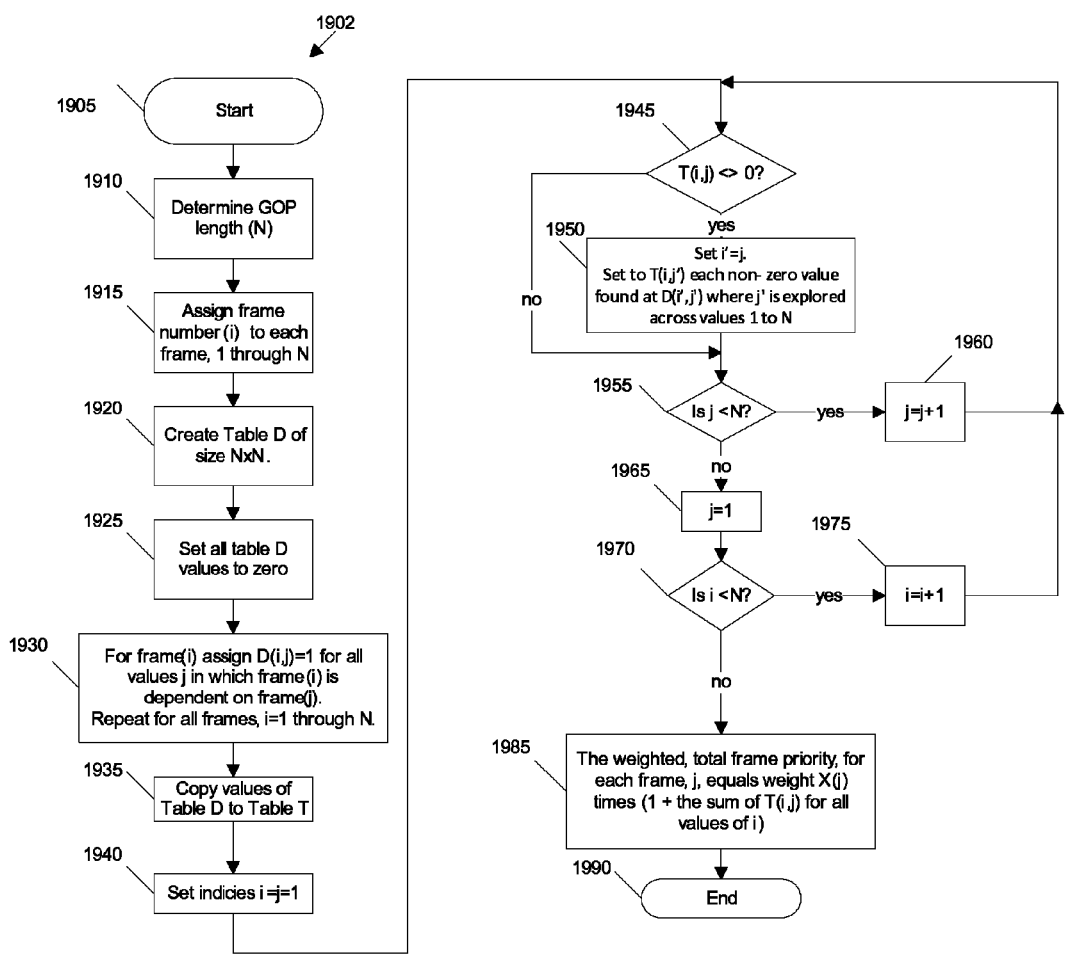
FIG. 19 is a flow diagram of a method for determining burdens for frames in a group of pictures according to an embodiment.

FIG. 19 illustrates a method 1902 for determining burden based on both direct dependencies and indirect dependencies. As described above, the method may be implemented by the determination module 744. In another embodiment, the method may be implemented by another device or module. For the purpose of explanation, the method is described with respect to the decision module.

Steps 1905, 1910, 1915, 1920, 1925, and 1930 are similar to the corresponding steps of method 1505 described in relationship to FIG. 15. For details on the implementation of these steps, refer back to the description with respect to FIG. 15.

Continuing at step 1935, the determination module creates a total burden table T. The determination module copies the values of the table D, generated at step 1930, into table T. The total burden table T is an N×N table that the determination module uses to determine the effect of both direct and indirect dependencies on burden. For example, with respect to the GOP of FIG. 12, the determination module 744 uses this trace-back approach to account for the dependence of Frame B9 on Frame I1 (via B7). In particular, the determination module includes the burden of Frame B9 on Frame I1 in the burden value of Frame I1. In one embodiment, the determination module uses a trace-back approach in order to account for the indirect dependency of one frame on another.

At step 1940, the determination module sets the values of its two indices, i and j equal to 1. At step 1945, the determination module determines if the value of table T at position (i,j) is greater than zero. In this manner, the determination module determines if the frame j has a dependent frame. If so, the method proceeds to step 1950. In step 1950, the determination module determines for the frame, j, using a dependent indirect burden table, D, if the frame j itself is dependent on any other frames. If so, then the dependent frame of frame j is included in the burden of the frame for which j is a dependent. For example, using the GOP referenced in FIG. 12 and table D of FIG. 18, the direct dependence of frame B9 on B7 is indicated in the direct burden table D as a value of D(9,7) equal to 1. At step 1250, the determination module determines if B7 itself is dependent on any frame. The determination module performs this process by searching column 7 of table D for the existence of any entries greater than zero. In this example, a 1 is found at table location D(7,1) indicating that frame B7 is dependent on frame I1. Therefore, by definition, frame B9 is a first level, indirect dependent of frame I1. This information is recorded by placing a 1 into total burden table T at position T(9,1). FIG. 20 shows the total frame burden table T described with respect to FIG. 19. The shaded values in table T indicated indirect dependencies captured by the determination module utilizing the method of FIG. 19.

Continuing from step 1950, or if the result of decision step 1945 is no, the method proceeds to step 1955. At step 1955, the determination module compares the index j to the value N. If j is less than N, the method proceeds to step 1960. At step 1960 the determination module increments the index j by one and the method returns to decision step 1945. Returning to decision step 1955, if the index j is not less than N, the method proceeds to step 1965. At step 1965 the determination module sets the index j equal to 1. Continuing at step 1970, the determination module determines if the index i is less than N. If i is less than N, the method proceeds to step 1975. At step 1975 the determination module increments the index i by one and the method returns to decision step 1945. Returning to decision step 1970, if the index i is not less than N, the method proceeds to step 1985.

The effect of steps 1940, 1955, 1960, 1965, 1970, and 1975 is for the determination module to evaluate the dependencies of the GOP using a two level 'nested' loop. Thus, the determination module explores all of the values in direct burden table D for tabulation in total burden table T.

The nested loops are complete after the determination module reaches a 'no' decision in step 1970. At that point, total burden table T contains the direct and first level indirect frame relationships between all GOP frames. At step 1985, for each frame j, the determination module sums the values of table T(i,j) for all values of i, adds one, and then multiplies the result by weight X(j). Note that adding one causes the burden to be non-zero, thereby allowing differentiation through different weights. For instance if two B frames with no dependencies (same burden) had different weights (e.g. if they were different sizes) not adding one would cause the burdens to be zero causing the product of the burden and the respective weights to be zero for both B frames. However adding 1 allows the product of the burdens and the weights to be not equal for the two B frames. The resulting N length vector is the weighted, total frame priority for the GOP. The total frame priority determined by the determination module is shown in FIG. 20 where the weighting vector used is the weighting vector shown in FIG. 16.

The 'trace-back' method described with respect to FIG. 19 will calculate the frame burden based upon the direct dependencies and a single level of indirect dependency. One skilled in the art will appreciate that this method could be extended to include the effect of all indirect dependencies, without limit to the number of dependency levels. In other words, the 'trace-back' can be designed such that the determination module follows dependencies from root to leaf nodes.

One embodiment to extend the dependency tracking is for the determination module to create n−1 additional burden tables T2, through Tn where each burden table represents the cumulative representation of all dependencies from direct dependencies through nth level indirect dependencies. For example table T3 would represent direct dependencies plus all first, second, and third level indirect dependencies. In terms of the method of FIG. 19, step 1935-1975 would be performed by the determination module for each table Tn. In those steps, the Tn takes the place of table T and table T(n−1) takes the place of table D. The determination module would finish generating tables once all the elements of a table Tn were equal to all the elements of a table T(n+1), i.e., no new dependencies are identified by the creation of an additional burden table, T(n+1).

In another embodiment, the determination module can take into account duplicate dependencies. For example, as depicted in the table of FIG. 18 based on the GOP of FIG. 12, the methods described above do not result in an increased frame burden if more than one dependency path exists between frames. For example, Frame I1 is awarded 1 unit of burden due to a dependent frame, B3, despite the fact that there are two dependency paths between I1 and B3. One is direct; the other is indirect via frame B4. In one embodiment, the determination module accounts for these duplicate references in order to further amplify the differences among frame burdens. For example, in the case above, frame I1 would be awarded one additional unit of burden due to the second, duplicate reference between frame B3 and I1.

The methods described with respect to FIGS. 15 and 19 consider intra-GOP dependency. In other embodiments the determination module can also consider inter-GOP dependencies present in an open GOP structure.

As described above, multiple approaches can be used to create a useful weight vector X for use by the determination module in calculating total frame priority. For example, as previously described above with respect to FIGS. 16 and 17, weights could be assigned based upon frame type (I, P or B), by frame size or some combination of the two.

In another embodiment, the weight vector is extended into the form of a weight table X, of size N×N. In this approach, additional information about frame dependency is considered when assigning weight and calculating priority. In one embodiment, weights are applied to dependencies based upon the 'directness' of the relationship between the frames being considered. That is, the weight applied to direct dependencies is larger than the weight applied to indirect dependencies. In another embodiment, first level, indirect dependencies are weighted higher than second level, indirect dependencies. Similarly, second level indirect dependencies are weighted higher than third level, and so on.

For example, weight values of 3, 2 and 1 can be applied to direct dependencies, first level indirect dependencies and second level indirect dependencies, respectively. FIG. 21 illustrates a weight table X for using this weighting scheme for the total frame burden table T of FIG. 20.

The weight table X of size N×N can replace weight vector X of size N in Step 1985 of FIG. 19. When using weight table X, the weighted total frame priority can be calculated for each frame j by summing the product of $T(i,j)*X(i,j)$ for all values of i, from 1 to N.

Advantageously, this approach takes into account that error propagation may be mitigated by I macroblocks as frame errors propagate through the GOP. Thus the importance of dependencies may be reduced as the level of 'directness' between frames is also reduced.

Slices

In MPEG-2, MPEG-4, and H.264 frames may be further broken into slices. Slices contain an integer number of macroblocks all from the same frame. The dividing of a frame into slices can be implemented by using a single slice for a frame. A frame can also be divided into j slices, each containing a fixed number of macroblocks. Alternatively, a frame may be divided into k slices, each containing a variable number of macroblocks. The macroblocks within a slice are not dependent on the macroblocks in other slices from the same frame. If a slice is less than an entire frame, loss of the slice will impact the quality of the video less than the loss of the entire frame.

As with frames, there are I slices, P slices, and B slices. I slices only contain I macroblocks which are encoded without dependencies on macroblocks in other frames. P slices may contain I macroblocks or P macroblocks, or both. P macroblocks are encoded based on a previous (or next) I frame or P frame. B slices may contain I, P, or B macroblocks or any combination. B macroblocks are bidirectionally encoded based on both a previous and a subsequent I or P frames.

The same prioritization method, described previously for frames, can be applied to slices. For instance an I slice that is part of an I frame could be assigned the same burden and priority as the original I frame by the determination module. Similarly, the burden and priority for a P slice could be assigned the same burden and priority as the original P frame. The burden and priority for a B slice could be assigned the same burden and priority as the original B frame.

Since the macroblocks in one slice of a frame can be decoded independent of the macroblocks of the other slices comprising a frame, prioritizing slices allows a finer grain discard during times of congestion or other times when a reduction in data rate is necessary or beneficial.

In addition to prioritizing based on burden and frame or slice type, the determination module can further differentiate slices with the same burden based on the relative quantity of each variety of macroblock they contain. For example, if two P slices have the same burden, the P slice with more I macroblocks and fewer P macroblocks may be given priority over a P slice with fewer I macroblocks or more P macroblocks. Alternatively, the fine grain priority adjustment may be based on ratio of I macroblocks to P macroblocks within the slice. A similar fine grained priority adjustment can be applied to B slices based on the count or ratio of I, P, and B macroblocks. In another embodiment, since I macroblocks typically contain more data than P macroblocks and P macroblocks typically contain more data than B macroblocks, the determination module can adjust priority based on the average size of the macroblocks contained in the slice. This can be calculated by dividing the size of the slice in bytes by the number of macroblocks in the slice.

In one embodiment, the determination module implements a scoring system. For example, the determination module can apply an adjustment that accounts for the differences in macroblocks in slices of the same priority level or burden while not allowing slices to cross to a different priority level or burden. In one embodiment, the determination module uses a number such that adding or subtracting the number from a priority value moves the priority value less than half way to the next lower or higher priority. If the difference between priority levels is the integer value 1, then any number x greater than zero, but less than 0.5 could be used. For example, x could equal 0.4.

Figure 22:
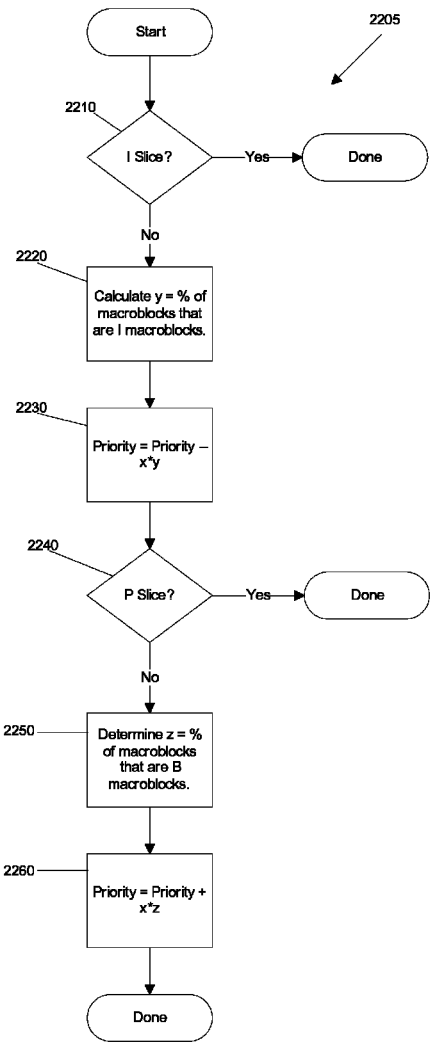
FIG. 22 is a flow diagram of a method for determining priority of a frame according to an embodiment.

FIG. 22 illustrates a method 2205 for modifying the priority of a slice based on the macroblocks in the slice. As described above, the method may be implemented by the determination module 744. In another embodiment, the method may be implemented by another device or module. For the purpose of explanation, the method is described with respect to the determination module. Further, in the present description, a lower priority numbers means a higher priority. One skilled in the art would recognize that this method can also be used for modifying the priority of a frame based on the macroblocks in the frame.

At decision step 2210 the determination module determines if a current slice in the frame is an I slice. If so, the evaluation of the current slice ends and the next slice is considered. If the current slice is not an I slice, the method proceeds to step 2220. At step 2220 the determination module determines a value, y, that is the percentage of macroblocks in the current slice that are I macroblocks. Continuing at step 2230 the determination module adjusts the priority of the current slice by multiplying x and y and subtracting the product from the slice's current priority. In this manner, the presence of I macro blocks in the slice results in a lower priority number for the slice, i.e., a higher effective priority.

Continuing at step 2240, the determination module determines if the current slice is a P slice. If so, the evaluation of the current slice ends and the next slice is considered. If the current slice is not a P slice, the method proceeds to step 2250. At step 2250 the determination module determines a value, z, that is the percentage of macroblocks in the current slice that are B macroblocks. Continuing at step 2260 the determination module adjusts the priority of the current slice by multiplying x and z and adding the product to the slice's current priority. In this manner, the presence of B macro blocks in the slice results in a higher priority number for the slice, i.e., a lower effective priority. In another embodiment, a different value for x can be used in this step than was used in step 2330 in order to provide greater control over relative priorities. As noted, the determination module can repeat this process for each slice in order to determine adjustments to the slices' priorities.

Figure 23:
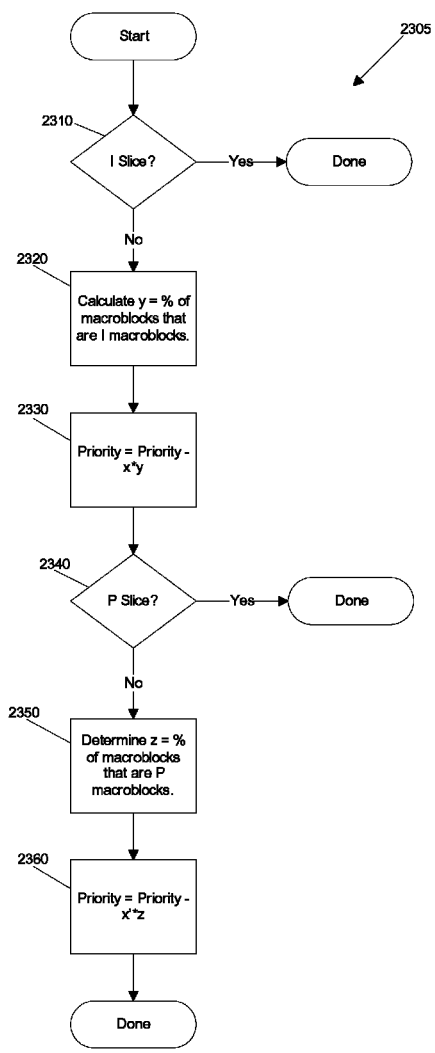
FIG. 23 is a flow diagram of a method for determining priority of a frame according to an embodiment.

FIG. 23 illustrates a method 2305 for modifying the priority of a slice based on the macroblocks in the slice. As described above, the method may be implemented by the determination module 744. In another embodiment, the method may be implemented by another device or module. For the purpose of explanation, the method is described with respect to the decision module. Further, in the present description, a lower priority numbers means a higher priority. One skilled in the art would recognize that this method can also be used for modifying the priority of a frame based on the macroblocks in the frame.

The steps 2310, 2320, 2330, and 2340 are identical to the corresponding steps of method 2205 of FIG. 22. For details of the implementation of these steps refer to description of the corresponding steps with respect to FIG. 22. Continuing at step 2350, the determination module determines a number, z, that represents the percentage of macroblocks in the current slice that are P macroblocks. Continuing at step 2360, the determination module adjusts the priority of the current slice by multiplying x' and z and subtracting the product to the slice's current priority. In this step, x' is calculated similar to x, but allows a different adjustment to be applied for P macroblocks than for 1 macroblocks in the B slice.

One skilled in the art would appreciate that other adjustments may be made to a slice or frame priority based on the number, percentage, or size of I, P, and B macroblocks.

Some video standards such as H.264-AVC allow redundant slices. Redundant slices carry redundant information in case an original frame is lost or damaged. For the purposes of prioritized discard, redundant slices are assigned a priority level lower than that of B slices since they generally will not be needed by the decoder.

Some video standards such as H.264-AVC allow switching slices that allow easier or faster switching between video streams. SI slices allow switching between completely different streams. In one embodiment, if no stream switching is expected, SI slices are assigned a lower priority than B frames since they generally will not be used by the decoder. However, if switching streams is expected to be common, such as in a multicast or broadcast system streaming multiple video streams simultaneously, policy may dictate the priority of SI slices, and they may be prioritized above B or P slices, but typically not above I slices. Similarly, SP slices allow easier or faster switching between streams of the same video content encoded at different rates or resolutions. Unless such a switch is to be made, SP slices are assigned a lower priority than B slices. However, if such a switch is to be made, SP slices are assigned a priority in the same manner as P slices.

Both SI and SP slices can be used for video playback and management functions under the control of a human viewer. For example, a person may choose to fast forward or rewind the content currently being viewed. A person may choose to change viewing streams (or 'channels' as they are commonly described in broadcast video) or adjust the displayed resolution and/or screen size once such playback has begun. Depending on the video standard and encoding methods, these viewer requests may involve the use or increased use of SP and/or SI frames. Since user control response time is a critical performance metric for video transport and playback systems, the importance of SP and/or SI frames is substantially higher during such periods of user requests.

In one embodiment, dynamic prioritization for SI and SP frames is used to detect user requests and respond by increasing the frame priority for SI and SP frames. This can be implemented, for example by the control response module 340. The request detection can take several forms. One approach is to monitor uplink control traffic (traveling in the opposite direction of the video traffic) in order to detect specific user requests. Another form establishes a baseline frame rate for SI and SP frames, measured for example using frames per second, and to detect periods when the current SI or SP frame rate exceeds this baseline rate by some predetermined threshold, for example by a factor of 2x. Once a user request has been detected, the priority level for SI or SP frames is raised and can even surpass the priority level currently assigned to I frames. The increased priority level can be maintained for the duration of user request(s) plus some configurable timeout period.

Data Partitioning

In some video standards such as H.264-AVC, the data in a slice may be further arranged into data partitions. For example, a slice in H.264-AVC may be partitioned into three data partitions. Data partition 1 contains the slice header and the header data for each macroblock. Data partition 2 contains the data portion of I or SI macroblocks from the slice. Data partition 3 contains the data portion of P, B, and SP macroblocks from the slice. These data partitions may be transported separately. Data partitions 1 and 2 are both necessary to recover the I macroblocks, so they may be linked together for discard prioritization by the determination module. The priority of partitions 1 and 2 can have their priority adjusted by applying the slice priority adjustment algorithm to data partition 2 and assigning the same priority to data partition 1. Alternatively, since data partition 1 is also necessary for use of data partition 3, data partition 1 can be assigned a priority that is slightly higher than the priority of data partition 2. The priority of data partition 3 can have its priority adjusted by applying the slice priority adjustment algorithm to data partition 3.

One skilled in the art will appreciate that the prioritization described above may be used for other purposes than intelligent discard, for instance enhancing Call Admission Control by providing additional information regarding how much data from a video service may be discarded while maintaining a required service quality, thus allowing more services to be admitted than would be possible without this information.

As described above, the packet discard and frame analysis described above may be performed by communication devices or systems including, but not limited to, an access point, base station, macrocell, picocell, enterprise femtocell, residential femtocell, relay, small form factor base station, subscriber station, core network system or other device. In some embodiments, these communication devices may comprise one or more processors, transceivers, antenna systems, and computer-readable memories or media that operate to accomplish the functionality described herein.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs").

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A base station for managing video transmission responsive to network conditions, the base station comprising:
 a determination module configured to
  receive a video stream, the video stream including frames, at least some of the frames including macroblocks, each of the macroblocks having a macroblock type, and
  inspect the received video stream to determine a macroblock type for each of the macroblocks and a priority value for each of the macroblocks, the priority value of each of the macroblocks based at least in part on the macroblock type;
 a selection module configured to discard one or more of the macroblocks based at least in part on the priority values of the macroblocks; and
 a modem configured to transmit at least one of the macroblocks that are not discarded to one or more subscriber stations.

2. The base station of claim 1, wherein the macroblock types include an intra-coded (I) type macroblock, a predictive-coded (P) type macroblock, and a bidirectionally predictive-coded (B) type macroblock, and wherein the selection module is further configured to preferentially discard macroblocks of type B over macroblocks of type P and to preferentially discard macroblocks of type P over macroblocks of type I.

3. A base station for managing video transmission responsive to network conditions, the base station comprising:
 a determination module configured to
  receive a video stream, the video stream including frames, at least some of the frames including macroblocks, each of the macroblocks having a macroblock type, and
  inspect the received video stream to determine a macroblock type for each of the macroblocks and a priority value for each of the frames, the priority value of each of the frames based at least in part on the macroblock type of each of the macroblocks in the frame;
 a selection module configured to discard one or more of the frames based at least in part on the priority values of the frames; and
 a modem configured to transmit at least one of the frames that are not discarded to one or more subscriber stations.

4. The base station of claim 3, wherein the macroblock types include an intra-coded (I) type macroblock, a predictive-coded (P) type macroblock, and a bidirectionally predictive-coded (B) type macroblock.

5. The base station of claim 4, wherein the priority value of each of the frames is based at least in part on the percentage of macroblocks in the frame that are an intra-coded (I) type macroblock.

6. The base station of claim 4, wherein the priority value of each of the frames is based at least in part on the percentage of macroblocks in the frame that are a predictive-coded (P) type macroblock.

7. The base station of claim 4, wherein the priority value of each of the frames is based at least in part on the percentage of macroblocks in the frame that are a bidirectionally predictive-coded (B) type macroblock.

8. The base station of claim 4, wherein the priority value of each of the frames is based at least in part on the percentage of macroblocks in the frame that are an intra-coded (I) type macroblock, the percentage of macroblocks in the frame that a predictive-coded (P) type macroblock, and the percentage of macroblocks in the frame that a bidirectionally predictive-coded (B) type macroblock, wherein frames with higher percentages of type B macroblocks are preferentially discarded over frames with higher percentages of type P macroblocks, and frames with higher percentages of type P macroblocks are preferentially discarded over frames with higher percentages of type I macroblocks.

9. The base station of claim 3, wherein the priority values for the frames are further based at least in part on sizes of the frames.

10. The base station of claim 3, wherein the priority value for each of the frames is further based at least in part on whether an adjacent frame has been discarded.

11. The base station of claim 3, wherein some of the frames depend on one or more others of the frames for decoding, and the priority value of each respective frame is further based at least in part on the number of other frames that are dependent upon the respective frame.

12. The base station of claim 3, wherein the priority value of each respective frame is further based at least in part on the number of other frames that are indirectly dependent upon the respective frame.

13. The base station of claim 3, wherein the frames comprise a group of pictures (GOP).

14. The base station of claim 13, wherein some of the frames depend on one or more others of the frames for decoding, and the priority value of each respective frame is further based at least in part on the number of other frames that are dependent upon the respective frame.

15. A base station for managing video transmission responsive to network conditions, the base station comprising:

a determination module configured to
receive a video stream, the video stream including frames, at least some of the frames including slices, at least some of the slices including macroblocks, each of the macroblocks having a macroblock type, and
inspect the received video stream to determine a macroblock type for each of the macroblocks and a priority value for each of the slices, the priority value of each of the slices based at least in part on the macroblock type of each of the macroblocks in the slice;
a selection module configured to discard one or more of the slices based at least in part on the priority values of the slices; and
a modem configured to transmit at least one of the slices that are not discarded to one or more subscriber stations.

16. The base station of claim 15, wherein the discarded one or more of the slices comprise at least all of the slices of one of the frames.

17. The base station of claim 15, wherein the macroblock types include an intra-coded (I) type macroblock, a predictive-coded (P) type macroblock, and a bidirectionally predictive-coded (B) type macroblock.

18. The base station of claim 17, wherein the priority value of each of the slices is based at least in part on the percentage of macroblocks in the slice that are an intra-coded (I) type macroblock.

19. The base station of claim 17, wherein the priority value of each of the slices is based at least in part on the percentage of macroblocks in the slice that are a predictive-coded (P) type macroblock.

20. The base station of claim 17, wherein the priority value of each of the slices is based at least in part on the percentage of macroblocks in the slice that are a bidirectionally predictive-coded (B) type macroblock.

21. The base station of claim 17, wherein the priority value of each of the slices is based at least in part on the percentage of macroblocks in the slice that are an intra-coded (I) type macroblock, the percentage of macroblocks in the slice that a predictive-coded (P) type macroblock, and the percentage of macroblocks in the slice that a bidirectionally predictive-coded (B) type macroblock, wherein frames with higher percentages of type B macroblocks are preferentially discarded over frames with higher percentages of type P macroblocks, and frames with higher percentages of type P macroblocks are preferentially discarded over frames with higher percentages of type I macroblocks.

22. The base station of claim 15, wherein the priority value for each slice is further based at least in part on size of the slice.

23. The base station of claim 15, wherein slices that are redundant are preferentially discarded over slices that are not redundant.

24. The base station of claim 15, wherein some of the slices are switching slices and the priority value for a slice that is a switching slice is dynamic.

25. A method for managing video transmission from a base station responsive to network conditions, the method comprising:
receiving a video stream, the video stream including frames, at least some of the frames including macroblocks, each of the macroblocks having a macroblock type;
inspecting the received video stream to determine a macroblock type for each of the macroblocks and a priority value for each of the macroblocks, the priority value of each of the macroblocks based at least in part on the macroblock type;
discarding one or more of the macroblocks based at least in part on the priority values of the macroblocks; and
transmitting at least one of the macroblocks that are not discarded to one or more subscriber stations.

26. The method of claim 25, wherein the macroblock types include an intra-coded (I) type macroblock, a predictive-coded (P) type macroblock, and a bidirectionally predictive-coded (B) type macroblock, and macroblocks of type B are preferentially discarded over macroblocks of type P and macroblocks of type P are preferentially discarded over macroblocks of type I.

27. A method for managing video transmission from a base station responsive to network conditions, the method comprising:
receiving a video stream, the video stream including frames, at least some of the frames including macroblocks, each of the macroblocks having a macroblock type;
inspecting the received video stream to determine a macroblock type for each of the macroblocks and a priority value for each of the frames, the priority value of each of the frames based at least in part on the macroblock type of each of the macroblocks in the frame;
discarding one or more of the frames based at least in part on the priority values of the frames; and
transmitting at least one of the frames that are not discarded to one or more subscriber stations.

28. The method of claim 27, wherein the macroblock types include an intra-coded (I) type macroblock, a predictive-coded (P) type macroblock, and a bidirectionally predictive-coded (B) type macroblock.

29. The method of claim 28, wherein the priority value of each of the frames is based at least in part on the percentage of macroblocks in the frame that are an intra-coded (I) type macroblock.

30. The method of claim 28, wherein the priority value of each of the frames is based at least in part on the percentage of macroblocks in the frame that are a predictive-coded (P) type macroblock.

31. The method of claim 28, wherein the priority value of each of the frames is based at least in part on the percentage of macroblocks in the frame that are a bidirectionally predictive-coded (B) type macroblock.

32. The method of claim 28, wherein the priority value of each of the frames is based at least in part on the percentage of macroblocks in the frame that are an intra-coded (I) type macroblock, the percentage of macroblocks in the frame that a predictive-coded (P) type macroblock, and the percentage of macroblocks in the frame that a bidirectionally predictive-coded (B) type macroblock, wherein frames with higher percentages of type B macroblocks are preferentially discarded over frames with higher percentages of type P macroblocks, and frames with higher percentages of type P macroblocks are preferentially discarded over frames with higher percentages of type I macroblocks.

33. The method of claim 27, wherein the priority values for the frames are further based at least in part on sizes of the frames.

34. The method of claim 27, wherein the priority value for each of the frames is further based at least in part on whether an adjacent frame has been discarded.

35. The method of claim 27, wherein some of the frames depend on one or more others of the frames for decoding, and the priority value of each respective frame is further based at least in part on the number of other frames that are dependent upon the respective frame.

36. The method of claim 27, wherein the priority value of each respective frame is further based at least in part on the number of other frames that are indirectly dependent upon the respective frame.

37. The method of claim 27, wherein the frames comprise a group of pictures (GOP).

38. The method of claim 37, wherein some of the frames depend on one or more others of the frames for decoding, and the priority value of each respective frame is further based at least in part on the number of other frames that are dependent upon the respective frame.

39. A method for managing video transmission from a base station responsive to network conditions, the method comprising:
   receiving a video stream, the video stream including frames, at least some of the frames including slices, at least some of the slices including macroblocks, each of the macroblocks having a macroblock type;
   inspecting the received video stream to determine a macroblock type for each of the macroblocks and a priority value for each of the slices, the priority value of each of the slices based at least in part on the macroblock type of each of the macroblocks in the slice;
   discarding one or more of the slices based at least in part on the priority values of the slices; and
   transmitting at least one of the slices that are not discarded to one or more subscriber stations.

40. The method of claim 39, wherein the discarded one or more of the slices comprise at least all of the slices of one of the frames.

41. The method of claim 39, wherein the macroblock types include an intra-coded (I) type macroblock, a predictive-coded (P) type macroblock, and a bidirectionally predictive-coded (B) type macroblock.

42. The method of claim 41, wherein the priority value of each of the slices is based at least in part on the percentage of macroblocks in the slice that are an intra-coded (I) type macroblock.

43. The method of claim 41, wherein the priority value of each of the slices is based at least in part on the percentage of macroblocks in the slice that are a predictive-coded (P) type macroblock.

44. The method of claim 41, wherein the priority value of each of the slices is based at least in part on the percentage of macroblocks in the slice that are a bidirectionally predictive-coded (B) type macroblock.

45. The method of claim 41, wherein the priority value of each of the slices is based at least in part on the percentage of macroblocks in the slice that are an intra-coded (I) type macroblock, the percentage of macroblocks in the slice that a predictive-coded (P) type macroblock, and the percentage of macroblocks in the slice that a bidirectionally predictive-coded (B) type macroblock, wherein frames with higher percentages of type B macroblocks are preferentially discarded over frames with higher percentages of type P macroblocks, and frames with higher percentages of type P macroblocks are preferentially discarded over frames with higher percentages of type I macroblocks.

46. The method of claim 39, wherein the priority value for each slice is further based at least in part on size of the slice.

47. The method of claim 39, wherein slices that are redundant are preferentially discarded over slices that are not redundant.

48. The method of claim 39, wherein some of the slices are switching slices and the priority value for a slice that is a switching slice is dynamic.

* * * * *